(12) United States Patent
Sturm et al.

(10) Patent No.: US 10,783,135 B2
(45) Date of Patent: Sep. 22, 2020

(54) SYSTEMS AND METHODS FOR MIXED CONSISTENCY IN COMPUTING SYSTEMS

(71) Applicant: Thomson Reuters Enterprise Centre GmbH, Zug (CH)

(72) Inventors: Robert Sturm, Cottage Grove, MN (US); Brian Schuweiler, Maplewood, MN (US); Marcus Lange, Addison, TX (US); David Vibbert, Plano, TX (US); Kumar Unnirkrishnan, Irving, TX (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 811 days.

(21) Appl. No.: 15/014,384

(22) Filed: Feb. 3, 2016

(65) Prior Publication Data
US 2017/0220608 A1  Aug. 3, 2017

(51) Int. Cl.
*G06F 16/23* (2019.01)

(52) U.S. Cl.
CPC ................. *G06F 16/2365* (2019.01)

(58) Field of Classification Search
CPC .................................... G06F 16/2365
See application file for complete search history.

(56) References Cited

U.S. PATENT DOCUMENTS

| 5,710,894 A * | 1/1998 | Maulsby ............... G06F 8/34 345/473 |
| 6,009,405 A | 12/1999 | Leymann et al. |
| 7,747,648 B1 * | 6/2010 | Kraft ................. G06F 16/288 707/790 |
| 8,037,453 B1 * | 10/2011 | Zawadzki ............ G06F 11/368 717/107 |
| 8,560,574 B2 * | 10/2013 | Austin ................ G06F 17/50 707/793 |
| 8,798,010 B2 | 8/2014 | Kalfon et al. |

(Continued)

OTHER PUBLICATIONS

Kano et al., U-Compare: A modular NLP workflow construction and evaluation system, May/Jun. 2011, IEEE, vol. 55 No. 3 Paper 11, pp. 1-10.*

(Continued)

*Primary Examiner* — Neveen Abel Jalil
*Assistant Examiner* — Katriel Y Chiu
(74) *Attorney, Agent, or Firm* — McCarter & English, LLP

(57) ABSTRACT

Exemplary embodiments of the present disclosure relate to systems, methods, and non-transitory computer-readable media that achieve eventual consistency of interrelated data in a computing system based on a relationship between the interrelated data (e.g., dependencies between interrelated data) and a configuration of an application programmed to consume the interrelated data. Exemplary embodiments can utilize one or more implicit or explicit dependency graphs, such as an implied or explicit directed acyclic graph corresponding to the interrelated data and the dependencies between the interrelated data. Subsets of the interrelated data can be associated with one or more groups or boundaries in the dependency graphs based on a configuration of applications programmed to consume the interrelated data and/or based on the dependencies between the interrelated data.

23 Claims, 21 Drawing Sheets

(56) References Cited

U.S. PATENT DOCUMENTS

| | | | |
|---|---|---|---|
| 8,843,435 B1* | 9/2014 | Trefler | G06F 17/30607 |
| | | | 707/600 |
| 2004/0267807 A1 | 12/2004 | Barabas et al. | |
| 2006/0248451 A1* | 11/2006 | Szyperski | G06F 8/00 |
| | | | 715/209 |
| 2007/0198713 A1 | 8/2007 | Tsao et al. | |
| 2009/0178059 A1 | 7/2009 | Lang et al. | |
| 2009/0222691 A1* | 9/2009 | Riemers | G06F 16/214 |
| | | | 714/18 |
| 2013/0124545 A1* | 5/2013 | Holmberg | G06F 16/50 |
| | | | 707/756 |
| 2013/0160072 A1 | 6/2013 | Reus et al. | |
| 2014/0136799 A1 | 5/2014 | Fortin | |
| 2015/0074044 A1* | 3/2015 | Metreveli | G06F 17/30958 |
| | | | 707/609 |
| 2015/0172412 A1 | 6/2015 | Escriva et al. | |
| 2016/0026673 A1 | 1/2016 | Sun et al. | |
| 2016/0259841 A1* | 9/2016 | Andrew | G06Q 50/16 |

OTHER PUBLICATIONS

International Search Report and Written Opinion from related PCT patent applicaiton serial No. PCT/US2017/016247 dated Jun. 1, 2017.
Extended European Search Report form related European patent application No. 17748168.6 dated Jun. 28, 2019.

* cited by examiner

SYSTEMS AND METHODS FOR MIXED CONSISTENCY IN COMPUTING SYSTEMS

BACKGROUND

Overwhelming amounts of data have been made available in electronic form. In some instances one or more data elements in a set or sets of data can be dependent on or reference other data elements such that changes to a single data element can cause a chain reaction requiring hundreds, thousands, or even millions of other data elements that may, directly or indirectly, depend on or refer to the single data element to be updated that is not complete until all the affected data elements are updated based on the change to the single data element. As a result, propagating changes through a set of interrelated data can require tremendous computing resources, both in processing power and physical memory capacity, to try to ensure that all of the data elements reflect changes made to the data elements upon which they depend. Use of the set or sets of interrelated data at any given time while the affected data elements are being updated can result in data inconsistencies, unreliable data states, data access contentions, and/or other issues/problems related to the operation/function of one or more computing devices.

SUMMARY

Exemplary embodiments of the present disclosure relate to systems, methods, and non-transitory computer-readable media that achieve eventual consistency of interrelated data in a computing system based on a relationship between the interrelated data (e.g., dependencies between interrelated data) and a configuration of an application programmed to consume the interrelated data.

Exemplary embodiments can utilize one or more implicit or explicit dependency graphs, such as an implied or explicit directed acyclic graph corresponding to the interrelated data and the dependencies between the interrelated data. Subsets of the interrelated data can be associated with one or more groups or boundaries in the dependency graphs based on a configuration of applications programmed to consume the interrelated data and/or based on the dependencies between the interrelated data.

In exemplary embodiments, atomic, consistent, and isolated (ACI) transactions can be performed asynchronously on a boundary-by-boundary basis in response to events to update units of the interrelated data in response to changes in other units of interrelated data upon which the units of interrelated data depend. To minimize the effect of eventual consistency to a user of the interrelated data, exemplary embodiments can define the groups or boundaries based on how the consuming application presents the interrelated data to the users.

Exemplary embodiments of the present disclosure can advantageously reduce data contentions in computing systems, efficiently allocate physical resources including processor resources and memory resources based on the execution boundaries, enable parallel and asynchronous execution of ACI transactions, reduce ACI transaction times, and/or enable scaling in a distributed computing environment as the quantity of data increases. For example, exemplary embodiments of the present disclosure can advantageously allocate computing resources, both in processing power and physical memory capacity, based on the groups or boundaries and in response to the propagating effect of changes to interrelated data in one or more data sets while preventing affected data in a group or boundary from being accessed or viewed until changes to the data within the boundary have been completed and stored.

In accordance with embodiments of the present disclosure, a distributed computer system is disclosed. The distributed computing system includes shared computer resources that are concurrently accessible by user devices via a communications network. The shared computer resources include processing devices (e.g., of servers) and one or more data storage devices. The one or more data storage devices store data including interrelated units of data to be consumed by a consuming application that includes a user interface accessible by the user devices via the communications network to facilitate concurrent interaction with the data by at least two of the user devices. One or more of the processing devices can execute an engine to identify dependencies between the interrelated units of data stored in the one or more data storage devices, and associate the interrelated units of data with groups based on a configuration of the consuming application. The groups can include at least a first group and a second group. In response to modification of a first unit of data associated with the first group, one or more of the processing devices perform a series of operations that (i) restricts access to a first set of memory locations at which the interrelated units of data associated with the first group are stored (e.g., lock the first set of memory locations) to prevent reading or writing the memory locations and (ii) atomically update the state of the interrelated units of data in the first group from a first reliable state to a second reliable state. The one or more of the processing devices overwrite and derestrict (e.g., unlock) the first set of memory locations upon completion of the series of operations.

In accordance with embodiments, a computer-implemented method is disclosed. The method includes identifying dependencies between interrelated data stored in memory locations in one or more data storage devices and associating subsets of the interrelated data with groups based on a configuration of an application programmed to consume the interrelated data. The groups include at least a first group and a second group. The method also includes modifying a first unit of the interrelated data stored in a first memory location, where the first unit associated with the first group. In response to modifying the first unit stored in the first memory location, the method further includes allocating one or more processing devices to perform a series of operations that (i) restrict access to a first set of the memory locations at which a first subset of the interrelated data corresponding to the first group are stored (e.g., lock the first set of memory locations) to prevent reading or writing the first set of memory locations, (ii) atomically update a state of the interrelated data in the first group from a first reliable state to a second reliable state, and (iii) overwrite the at least a subset of the first set of memory locations to store the second reliable state.

In accordance with embodiments of the present disclosure, the one or more of the processing devices can associate the interrelated units of data with each other via an implied directed acyclic graph based on the dependencies and the groups correspond to boundaries within the implied directed acyclic graph. The one or more processing devices can maintain an eventual consistency of the state of the interrelated data based on the boundaries. The implied directed acyclic graph can be modified by the one or more processing device in response to changes to the dependencies between the interrelated units of data, and at least one of the boundaries can be modified by the one or more processing devices based on at least one of changes to the dependencies between the interrelated units of data or changes to the consuming application.

In accordance with embodiments of the present disclosure, the one or more processing devices can associate the interrelated units of data with the groups by determining whether the consuming application is configured to concurrently present the interrelated units of data to one or more of the user devices via the user interface.

When modification of the first unit of data may only affects the units of data associated with the first group, a second set of memory locations of the interrelated units of data associated with the second group can remain unrestricted (e.g., unlocked) throughout the series of operations. When modification of the first unit of data affects the units of data associated with the first and second groups, a second set of memory locations of the interrelated units of data associated with the second group can remain unrestricted (e.g., unlocked) and have an unreliable state for at least a portion of a duration of the series of operations. In response to an event generated by the one or more processing devices during the series of operation, the one or more processing devices can perform a separate series of operations that restrict (e.g., lock) the second set of memory locations at which the interrelated units of data associated with the second group are stored to prevent reading or writing the second set of memory locations and atomically update the state of the interrelated units of data associated with the second group from the unreliable state to the second reliable state. The event can correspond to modification of another unit of data associated with the first group upon which at least one of the units of data associated with the second group of data directly depends. At least a portion of the series of operations and the separate series of operations are performed as parallel operations by the one or more of the processing devices. A first one of the processing devices can be allocated to perform the series of operations and a second one of the processing devices can be allocated to perform the separate series of operations.

In accordance with embodiments of the present disclosure, a computer-implemented method is disclosed, where the method includes utilizing a distributed computer system including shared computer resources that are concurrently accessible by user terminals via a communications network, the shared computer resources including processing devices and data storage devices. The method also includes identifying dependencies between interrelated data stored in the data storage devices and associating the interrelated data with groups based on a configuration of an application configured to consume the interrelated data, the groups including at least a first group and a second group. In response to an event corresponding to receipt of a change to a selected data element of the interrelated data associated with the first group via the application, the method also includes allocating a first set of the processing devices to modify the data associated with the first group as an atomic, consistent, and isolated (ACI) transaction based on the dependencies between the interrelated data in the first group. In response to a subsequent event corresponding to a propagation of changes to the interrelated data from the first group to the second group as a result of the ACI transaction, the method further includes allocating a second set of processing devices to modify the interrelated data associated with the second group as a new ACI transaction based on the change to at least a portion of the interrelated data in the first group. The new ACI transaction can be performed asynchronously with respect to the ACI transaction.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying Figures. In the drawings, like reference numerals refer to like parts throughout the various views of the non-limiting and non-exhaustive embodiments.

DETAILED DESCRIPTION

Figure 1:
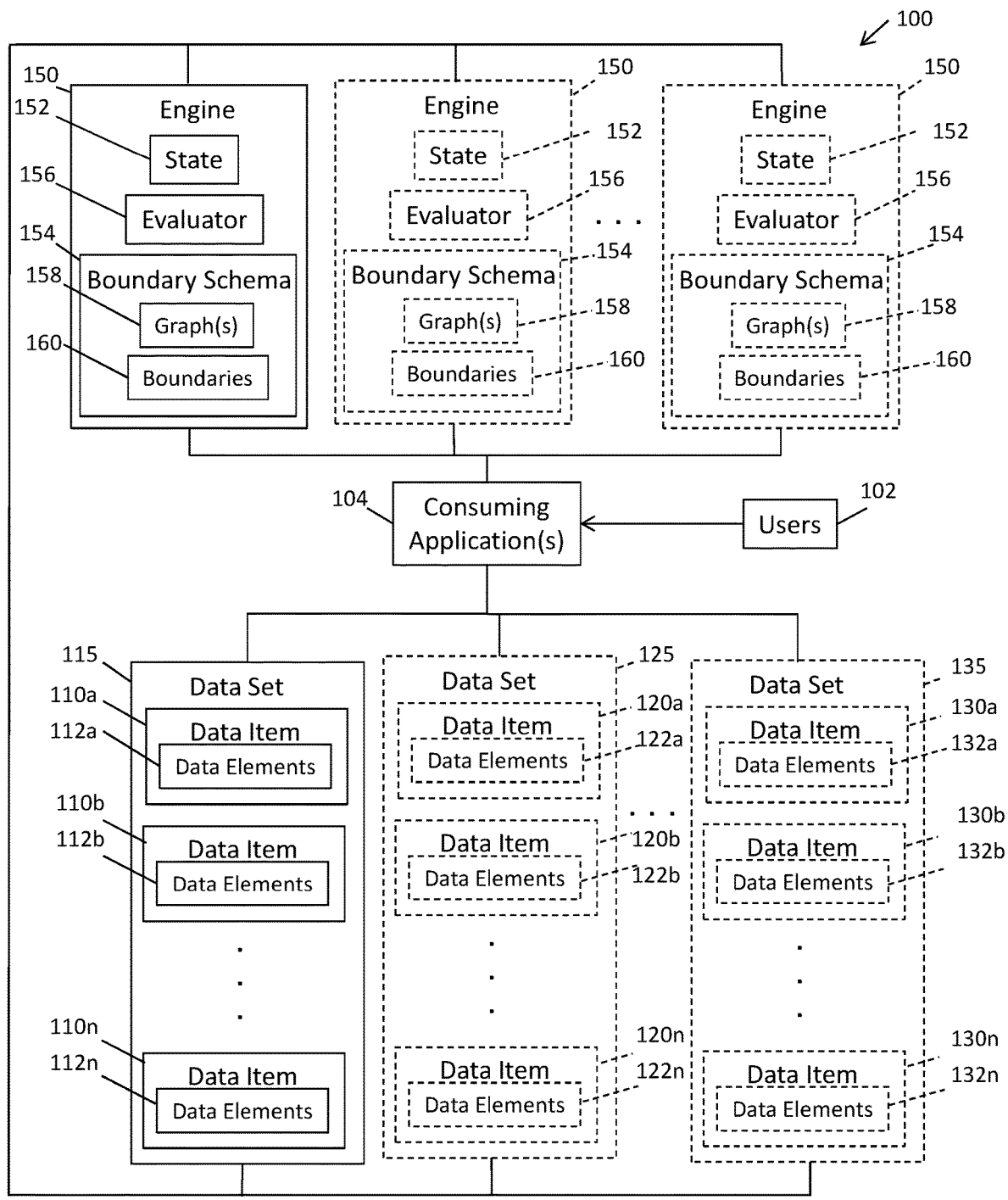
FIG. 1 is a data diagram of an environment for providing a scalable, multi-tenant, multi-user service to facilitate mixed consistency of interrelated data in a computing system in accordance with embodiments of the present disclosure.

Exemplary embodiments of the present disclosure relate to systems, methods, and non-transitory computer-readable media that achieve eventual consistency of interrelated data in a computing system based on a relationship between the interrelated data and a configuration of an application programmed to consume the interrelated data. Exemplary embodiments can provide for allocating resources in a distributed computing system for execution of a scalable, multi-tenant, multi-user service that facilitates interactions with one or more sets of interrelated data.

In exemplary embodiments, a state of the interrelated data can be maintained in-memory or cache and one or more dependency graphs can be implicitly or explicitly derived based on the state to track the relationship between the interrelated data. Subsets of the interrelated data from the one or more data sets can be associated with one or more groups or boundaries using a boundary schema that can determine the groups or boundaries based on a configuration of applications programmed to consume the interrelated data and/or based on the dependencies between the interrelated data. The dependency graph can include an implied or explicit directed acyclic graph or equivalent structure to map data dependencies between the interrelated data. The boundaries can be dynamically defined with respect to the graph(s) and can be designated in response to the consuming application being specified or utilized by one or more users and/or the interrelated data specified or utilized by one or more users.

Exemplary embodiments of the present disclosure can utilize the groups or boundaries to generate and perform transactions on a boundary-by-boundary basis, where each transaction can utilize the properties of atomicity, consistency, and isolation. This partitioning of transactions can be used to achieve scalable, parallel, and responsive execution of transactions within and across boundaries. The groups or boundaries may be referred to herein as ACI boundaries, where A denotes atomicity, C denotes consistency, and I denotes isolation, because the interrelated data associated with each group or boundary can separately and independent adhere to the properties of atomicity, consistency, and isolation. Atomicity provides that any change to data within a boundary commits changes to all affected data within the boundary in an atomic transaction. That is, either all of the affected data is changed or none of the affected data is changed within a given boundary. A strong consistency model must be adhered to within a boundary such that all reads and updates to values within a boundary must adhere to a linearizability consistency model. This proscribes stale reads from occurring within a given boundary and ensures that the interrelated data within a boundary changes from one reliable state to another reliable state for a given transaction. The principles of isolation ensure that all reads and writes to memory locations at which the interrelated within a boundary is stored appear to have happened in isolation and proscribes reads and writes from occurring against partially processed groups or boundaries.

By separating a graph into groups or boundaries, exemplary embodiments of the present disclosure can relax atomicity, consistency, and/or isolation properties in areas of the graph where atomicity, consistency, and/or isolation are not needed and can implement atomicity, consistency, and/or isolation properties in areas of the graph where they are needed. For example, atomicity, consistency, and/or isolation can be relaxed across execution boundaries to allow exemplary embodiments of the present disclosure to be implemented with a scalable and responsive design. Because the data is interrelated and data dependencies may transcend the groups or boundaries, the event-based boundary-by-boundary transactions may temporally permit some groups or boundaries to have an unreliable state or inaccurate data. However, such data is eventually updated by exemplary embodiments of the present disclosure to ensure eventual consistency. To minimize the effect of this eventual consistency to a user of the interrelated data, exemplary embodiments can define the groups or boundaries based on how the consuming application presents the interrelated data to the users.

Eventual consistency of data in different execution boundaries allows for lack of atomicity, and lack of isolation between inter-boundary events, which can become increasingly important as the size of the graph grows to hundreds of thousands or millions of cells/vertices. As a result, exemplary embodiments of the present disclosure can advantageously reduce data contentions in computing systems, efficiently allocate physical resources including processor resources and memory resources based on the execution boundaries, enable parallel and asynchronous execution of transactions, and/or enable scaling in a distributed computing environment as the quantity of data increases. For example, exemplary embodiments of the present disclosure can advantageously allocate computing resources, both in processing power and physical memory capacity, based on the groups or boundaries and in response to the propagating effect of changes to interrelated data in one or more data sets while preventing affected data in a group or boundary from being accessed or viewed until changes to the data within the boundary have been completed and stored.

FIG. 1 shows a block diagram of a computing environment 100 within which embodiments of the present disclosure can be implemented to achieve eventual data consistency across interrelated data, reduce data access contentions, automatically allocate physical computing resource, and/or enable scaling of physical computer resources, while providing a multi-user, multi-tenant environment (i.e. single instance of engine can serve multiple users) supporting concurrent usage of the interrelated data. As shown in the environment 100, one or more user 102 can interact with one or more instances of one or more consuming applications 104 to access and utilize data items 110a-n, 120a-n, and 130a-n, which form data sets 115, 125, and 135, respectively. One or more of the data items 110a-n, 120a-n, and/or 130a-n can be dependent on or refer to each other, such that changes to one of the data items requires other data items to be updated to maintain the integrity of the data items. In some embodiments, each of the data items 110a-n, 120a-n, and 130a-n can include data elements 112a-n, 122a-n, and 132a-n, respectively, where the data elements can be depend on or refer to each other, such that updates to a data element can require other data elements to be updated. As a non-liming example, the data sets 115, 125, and 135 can represent repositories, the data items can represent data structures, such as, computer files (e.g., in one or more file formats, such as text files, spreadsheet files, presentation/slide files, portable document format files, extensible markup language files, database files, executable files, object code files, computer-aided design files, etc.), and the data elements 112a-n, 122a-n, and 132a-n can represent fields, cells, tags, and/or any other suitable data elements. In exemplary embodiments, each of the data items and/or data elements may be referred to herein as units of data. As described herein, one or more instances of a data engine 150 in the computing environment 100 can be configured to ensure eventual data consistency of the data elements 112a-n, 122a-n, and 132a-n; the data items 110a-n, 120a-n, and 130a-n; and the data sets 115, 125, and 135.

The consuming applications 104 can be any applications programmed to read the data elements and/or data items from memory, write the data elements and/or data items to memory, render the data elements and/or data items in a graphical user interface based on a format and/or structure associated with the data elements and/or the data items. In some embodiments, the data elements and/or data items can be rendered in a graphical user interface of the consuming applications 104 based on formatting, structure, and/or constraints applied to the data elements and/or data items by the applications 104. For example, the one or more applications can be text editors or word processing applications (e.g., such as, Microsoft Word or any other suitable text editor or word processor application), spreadsheet applications (e.g., such as, Microsoft Excel or any other suitable spreadsheet application), code development applications (e.g., Microsoft Visual C++), portable document format (PDF) viewers/editors (e.g., such as those provided by Adobe Systems, Inc. or Nitro Software, Inc.), tax and accounting applications (e.g., such as, those from Thomson Reuters or Intuit, Inc.), database management systems (e.g., such as those provided by Microsoft or Oracle), and/or any other suitable applications.

The data engine 150 can interact with the consuming applications 104 to maintain data consistency of one or more interrelated data elements in the data items or elements and across one or more of the data sets 115, 125, and 135, reduce data access contentions in physical memory location where the data items or elements are stored, automatically allocate physical computing resources (e.g., processing units and/or memory), and/or enable scaling of physical computer resources (e.g., adding additional resources as needed), while providing a multi-user, multi-tenant service supporting concurrent usage of the interrelated data. In exemplary embodiments, the data engine 150 can be devoid of a user interface and is called or responds to requests from the applications 104 as a service. The data engine 150 can be an event driven (e.g., a change in the state of one data item or element can trigger a transaction to change in the states of data items or elements that depend, directly or indirectly, on the data item or element), scalable, stateful, distributed engine capable of generating and executing calculations for a large number (e.g., millions) of data elements. The data engine 150 can maintain a state 152 of the data items in the data sets 115, 125, and 135. The data engine 150 can store the state 152 in memory (e.g., cache) across several servers and can scale horizontally to add additional servers as necessary to maintain the state 152.

As shown in FIG. 1, the data engine 150 can include an evaluator 156 to update and/or modify one or more of the data items or elements in one or more of the data sets 115, 125, and 135 in response to changes to the state 152 of one or more units of data (e.g., data items and/or data elements) by the applications 104, e.g., based on an interaction between the users 102 and the applications 104. The evaluator 156 can update the state 152 of the modified units of data items or elements and can update the state of dependent data items or elements, as described herein, based on a boundary schema 154 used by the data engine 150. For example, a user interacting with the data item 110a via a graphical user interface provided by one of the consuming applications 104, can change data associated with the data item 110a, and in response to this change and/or being called by the consuming application(s) 104, the data engine 150 can update the state 152 and execute the evaluator 156 to evaluate the change and its propagation through the data item 110a as well as through the other data items based on the boundary schema and the data dependencies captured via the boundary schema 154. In some embodiments, the evaluator 156 can include a calculation engine for calculating changes to one or more data elements in one or more data items. The calculation engine can utilize operations, such as addition, subtraction, average, total, string splits, etc.

The engine 150 can use the boundary schema 154 to deduce one or more implied or explicit dependency graphs 158 based on data dependencies, formats, and/or structures for the data elements 112a-n, 122a-n, and 132a-n and/or the data items 110a-n, 120a-n, and 130a-n of the data sets 115, 125, and 135, respectively, as well as across different ones of the data sets 115, 125, and 135; and/or can implement the boundary schema 154 based on formatting, structure, constraints and/or parameters applied to the data items by the consuming applications 104 accessing and/or presenting the data items to the users 102. For example, in exemplary embodiments, the dependencies between data elements and/or data items can form an implicit or explicit directed acyclic graph, where the data items and/or data elements can correspond to vertices/fields and the dependencies between the data items and/or data elements can correspond to directed edges between the vertices/fields.

The data engine 150 can utilize the directed acyclic graphs to update a state of the data items and/or data elements in response to a change in a state of a modified data item and/or data element upon which the data items and/or data element depend. In some embodiments, the data items or elements corresponding to the vertices/fields can contain one or more expressions and/or one or more literal values, which may be null, where expressions can be a composition of functions including parameters/variables and/or literals. The parameters/variables can be other functions, a reference to another data item or element (e.g., another vertex/field), or a literal value. Functions perform calculations against their parameters and return values. Basic functions include, but are not limited to addition, subtraction, average, total, string splits, etc. A change to a data value associated with a vertex/field may trigger other vertices/fields that refer to the vertex/field to change their data value, which in may trigger other vertices/fields to changes their values, which can result in a chain reaction propagating through the interrelated data within and across one or more of the data sets 115, 125, and 135. In exemplary embodiments, the data engine 150 can enable concurrent user manipulation of the data items or elements by sharing the directed acyclic graphs among users in a multi-user environment.

The graphs 158 can be segmented or divided into groups or boundaries 160 based on the consuming application 104 utilized to consume the data items or elements and/or the dependencies of the data items or elements. For example, the structure or format in which the data items or elements are stored and/or the formatting, structure, constraints, and/or parameters applied to the data items or data elements by the consuming applications 104 (e.g., a configuration of the consuming application) can affect the groups or boundaries within the graph(s) 158. In exemplary embodiments, in response to changes to the dependencies between the data items or elements, and/or changes to the consuming application used to consume the data items or elements, the data engine 150 can change the groups or boundaries 160 in the graph(s) 158 such that the groups or boundaries 160 can be dynamically formed. An operation of the data engine 150 and the allocation of physical computer resources can be determined based on the groups or boundaries 160. For example, the data engine 150 can utilize atomicity, a strong consistency model, and principles of isolation on a boundary-by-boundary basis to achieve scalable, parallel, and responsive execution of events within and across execution boundaries 160.

The data engine 150 can perform an ACI transaction that utilizes the properties of atomicity, consistency, and isolation for intra-boundary changes. That is, in response to any change to a data item or element within a boundary, the data engine 150 updates all data items or elements within the boundary that depend on the changed data item or element or the engine 150 prevents updating any data items or elements within the boundary. The data items or elements outside of the boundary that depend on the changed data item or element excluded from of the ACI transaction.

The ACI transaction can utilize a linearizability consistency model for intra-boundary changes, such that, in response to any change to a data item or element within a boundary, the data engine 150 updates all data items or elements within the boundary that depend on the changed data item or element in a manner proscribes stale reads from occurring within the boundary and ensures that the data items or elements within the bound transition from one reliable state to another. However, for the data items or elements outside of the boundary that also depend on the changed data item or element, the data engine 150 can relax the properties of consistency to facilitate eventual consistency. For example, the data engine 150 can process changes within a boundary as an atomic, consistent, isolated transaction. If the changes in the boundary affect data items or elements in another boundary, the data engine 150 can process changes in the other boundary as a separate and distinct atomic, consistent, isolated transaction such that the transactions occur asynchronously with respect to each other and one transaction is not constrained by the properties of the properties transaction.

The ACI transaction can utilize the principles of isolation for intra-boundary changes. That is, in response to any change to a data item or element within a boundary, the data engine 150 ensures that all reads and writes to the memory locations at which the data items or elements within a boundary are stored appear to the consuming application and/or a user to have happened in isolation and proscribes reads and writes of the memory locations from occurring against partially processed execution boundaries.

By separating the graphs 158 or equivalent structures into groups or boundaries 160, and utilizing the properties of atomicity, linearizability consistency, and isolation within groups or boundaries, the data engine 160 can update data items or elements within a boundary as an atomic, consistent, and isolated (ACI) transaction (i.e., a series of operations performed by the data engine 150 that utilize atomicity, a linearizability consistency model, and isolation to update all affected data elements or data items within a boundary) and can update affected data items or elements in other execution boundaries asynchronously with respect to the ACI transaction being performed for the boundary. Generating and performing ACI transactions on a boundary-by-boundary basis allows the data engine 150 to relax the properties of atomicity, consistency, and isolation in areas of the graphs where these properties provide little to no realized benefit and may have a negative impact on the allocation and usage of resources, while applying these properties in areas of the graphs that can benefit from these properties to facilitate a scalable, resource efficient, and responsive design. Additionally, updating affected data items or elements based on the execution boundaries 160 can provide for eventual consistency across groups or boundaries, which can result in less data access contentions, lack of atomicity, and lack of isolation for events triggering changes to data items or elements that span one or more of the execution boundaries 160.

The data engine 150 can dynamically change the graphs 158 based on changes to the consuming applications 104 and changes to the dependencies of the data items or elements represented by the vertices/fields in the graph. For example, the consuming application 104 can apply formatting, structure, constraints, and/or parameters to the data items or data elements it consumes, and the formatting, structure, constraints, and/or parameters (e.g., a configuration of the consuming application) can affect a structure of the graph 158 and/or can affect the locations, quantity, and size of the execution boundaries 160 within the graphs. Changes to values of the data items or elements may additionally alter the graph structure itself. For example, when a data item or element including an expression containing a function with parameters referencing other data items or elements is added to a data set, a vertex/field can be added to the graph to reflect the addition.

As a non-limiting example of an application of embodiments of the present disclosure, the environment 100 can be configured to facilitate the completion of a set of tax forms for an IRS 1040 tax filing, where the forms are stored as computer files (e.g., XML files, HTML files, PDF files, etc.) across one or more data storage devices. Each of the forms can include one or more fields that can be populated with or defined by expressions or literal values. In the present example, each of the forms can correspond to data items and each of the fields within the forms can correspond to data elements. The forms can be defined to create dependencies between certain fields within a form or across one or more forms, e.g., one or more fields can reference one or more other fields. That is, a field in a form can depend on or reference another field in the form and/or can depend on or reference one or more fields in one or more different forms. For example, line 26 of form 1040 references to line 5 of form 3903. The data engine 150 can maintain the state of the forms and fields and can recognize the dependencies between the forms and fields to define an implied directed acyclic graph for the forms and fields.

To separate the graph into boundaries, the data engine 150 can determine whether a tax application (e.g., one of the applications 104) is configured to concurrently display certain forms to a user that include interrelated data. When the application is configured such that forms including interrelated data are never concurrently displayed to a user, the data engine 150 can determine that the forms can be grouped into different, separate boundaries. On the other hand, when the application is configured to concurrently display given forms to a user, the data engine 150 can group the given forms to within the same boundary. Separating the forms into boundaries in this manner can guarantee that forms that may be concurrently displayed (and included related data) are within the same boundary and that changes within any of the forms within the same boundary are propagated within the boundary as a single ACI transaction (i.e., a series of operations constrained by the data engine 150 according to the properties of atomicity, consistency, and isolation), while forms in another boundary that are affected by changes in the boundary are processed asynchronously as separate ACI transactions by the data engine 150.

Continuing with the above example, a change to line 1 on Form 3903 of the IRS 1040 tax filing in the tax application can be an event that will ultimately trigger a change in a value for line 26 of form 1040, where forms 3903 and 1040 are never concurrently displayed by the tax application, and therefore can reside in different boundaries. The data engine 150 can process this cross-boundary event (i.e. the triggering of a change to line 26 of the form 1040 based on a change in form 3903) asynchronously from the transaction that processes the changes to the fields within form 3903, providing for eventual consistency across boundaries. This eventual consistency achieved by embodiments of the data engine 150 can become increasingly important as the quantity of forms/fields increases or more generally as the quantity of data items or elements increase (e.g., the size of the graph grows) to hundreds of thousands or millions of forms/fields.

While the above example describes an application of the environment to tax forms, exemplary embodiments of the present disclosure can be implemented in various manners. As described herein, the data engine 150 can be executed as a service that is called or otherwise requested by a consuming application and can be operate as an independent and distinct service that is agnostic to the type of consuming applications that can utilize the service. That is, instances or manifestations of the data engine 150 can be used concurrently by various consuming applications, each being directed to different sets and types of interrelated data, and the data engine 150 can imply a graph for each of the various applications and establish different boundaries within each of the graphs based on the dependencies between the interrelated data and the consuming application used to consume the interrelated data. By defining the graph and the boundaries within the graph based on the data and/or the consuming application, exemplary embodiments of the data engine 150 provide for a dynamic and flexible service that can be utilized by any application consuming interrelated data.

Figure 2:
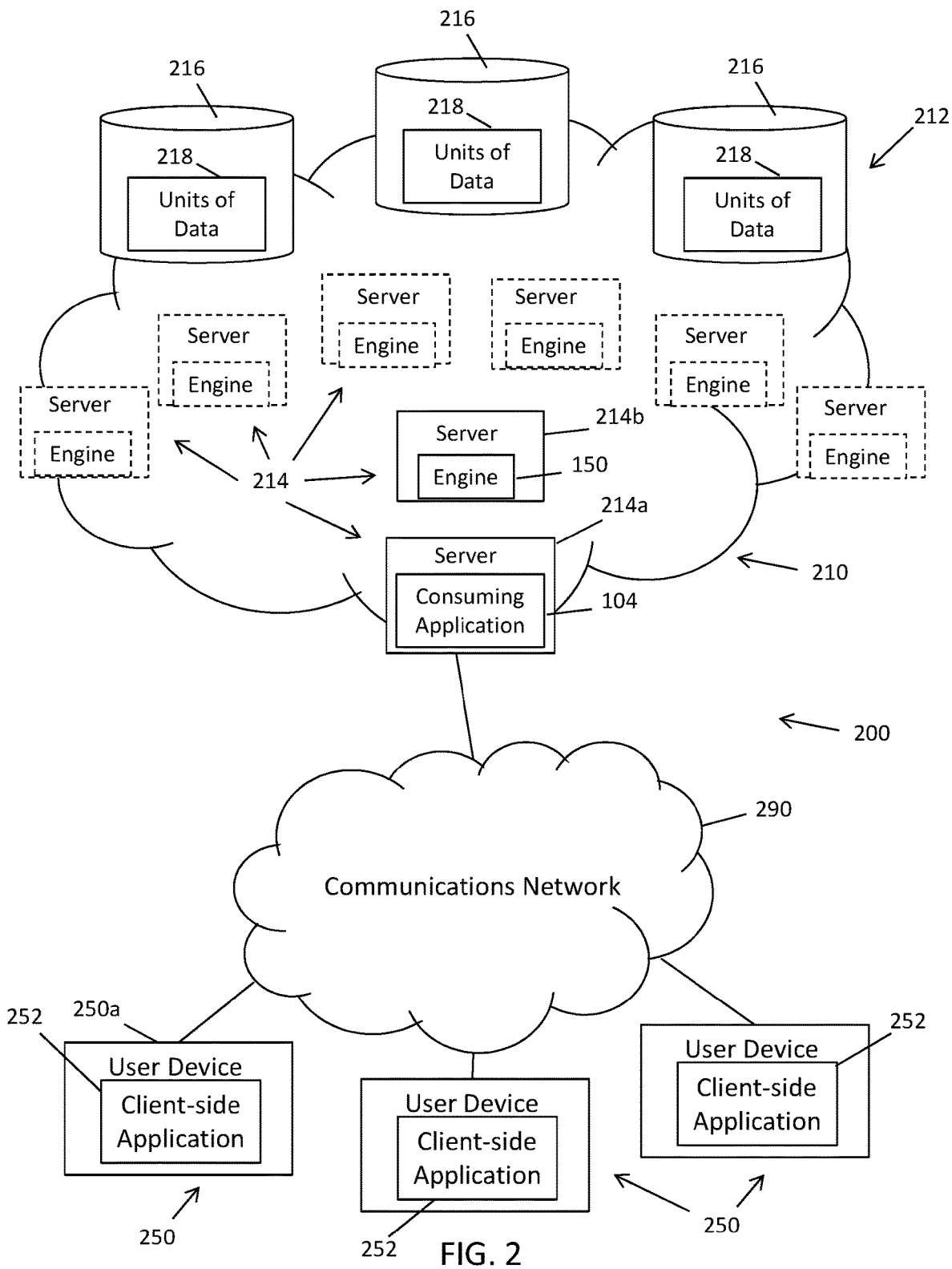
FIG. 2 is a block diagram of a distributed computing environment within which embodiments of the present disclosure can be implemented.
Figure 4:
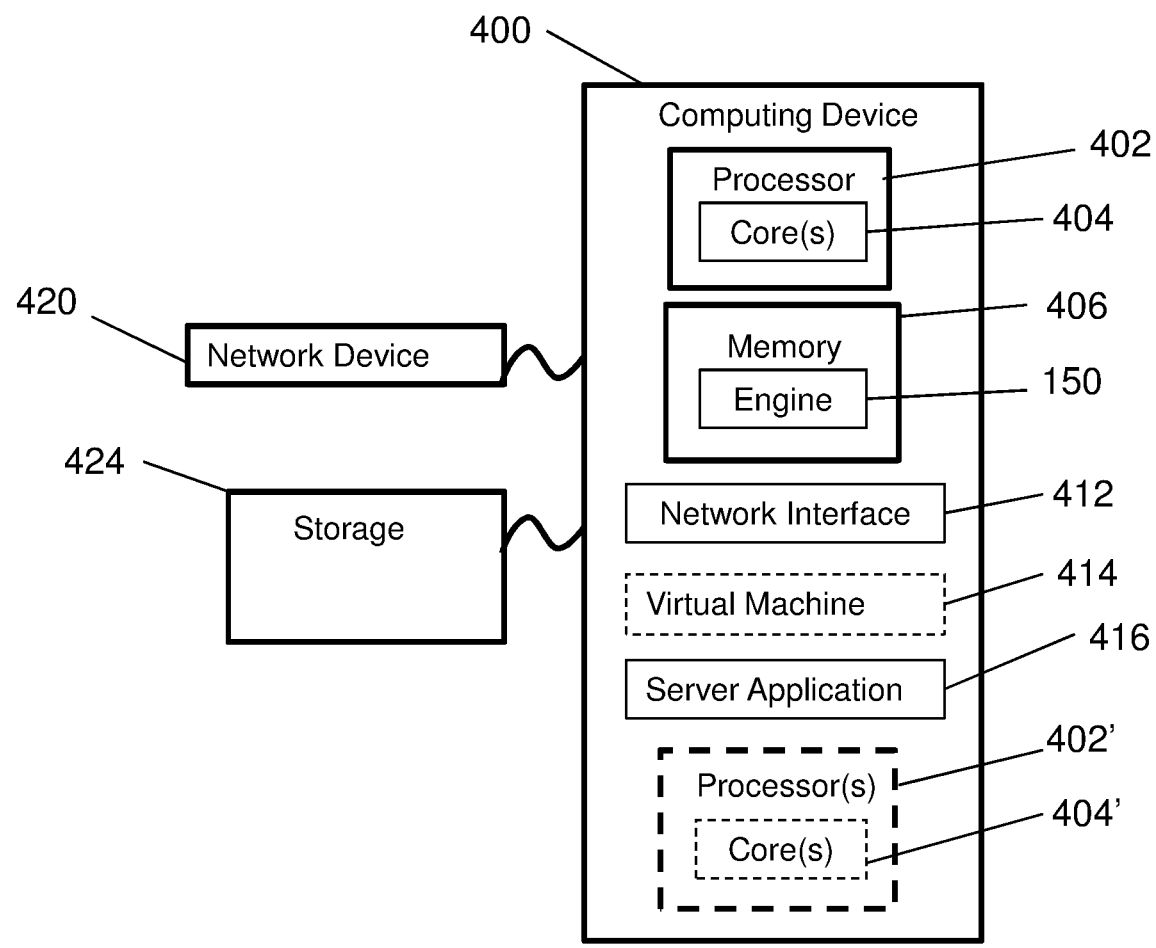
FIG. 4 is a block diagram of an exemplary computing device for implementing one or more servers in accordance with embodiments of the present disclosure.

FIG. 2 shows a distributed computing environment within which embodiments of the present disclosure can be implemented. As shown in FIG. 2, the environment 200 can include distributed computing system 210 including shared computer resources 212, such as servers 214 and (durable) data storage devices 216, which can be operatively coupled to each other. For example, two or more of the shared computer resources 212 can be directly connected to each other or can be connected to each other through one or more other network devices, such as switches, routers, hubs, and the like. Each of the servers 214 can include at least one processing device and each of the data storage devices 216 can include memory for storing interrelated units of data 218 (e.g., data items or elements) in one or more sets of data, as described herein. An exemplary server is depicted in FIG. 4.

Any one of the servers 214 can implement instances of the consuming application(s) 104 and/or the engine 150 or portions thereof. In some embodiments, one or more of the servers 214 can be a dedicated computer resource for implementing the consuming application(s) 104 and/or the engine 150. In some embodiments, one or more of the servers 214 can be dynamically grouped to collectively implement embodiments of the consuming application(s) 104 and/or the engine 150. In some embodiments, one or more servers can dynamically implement different instances of the consuming application(s) 104 and/or the engine 150.

Figure 5:
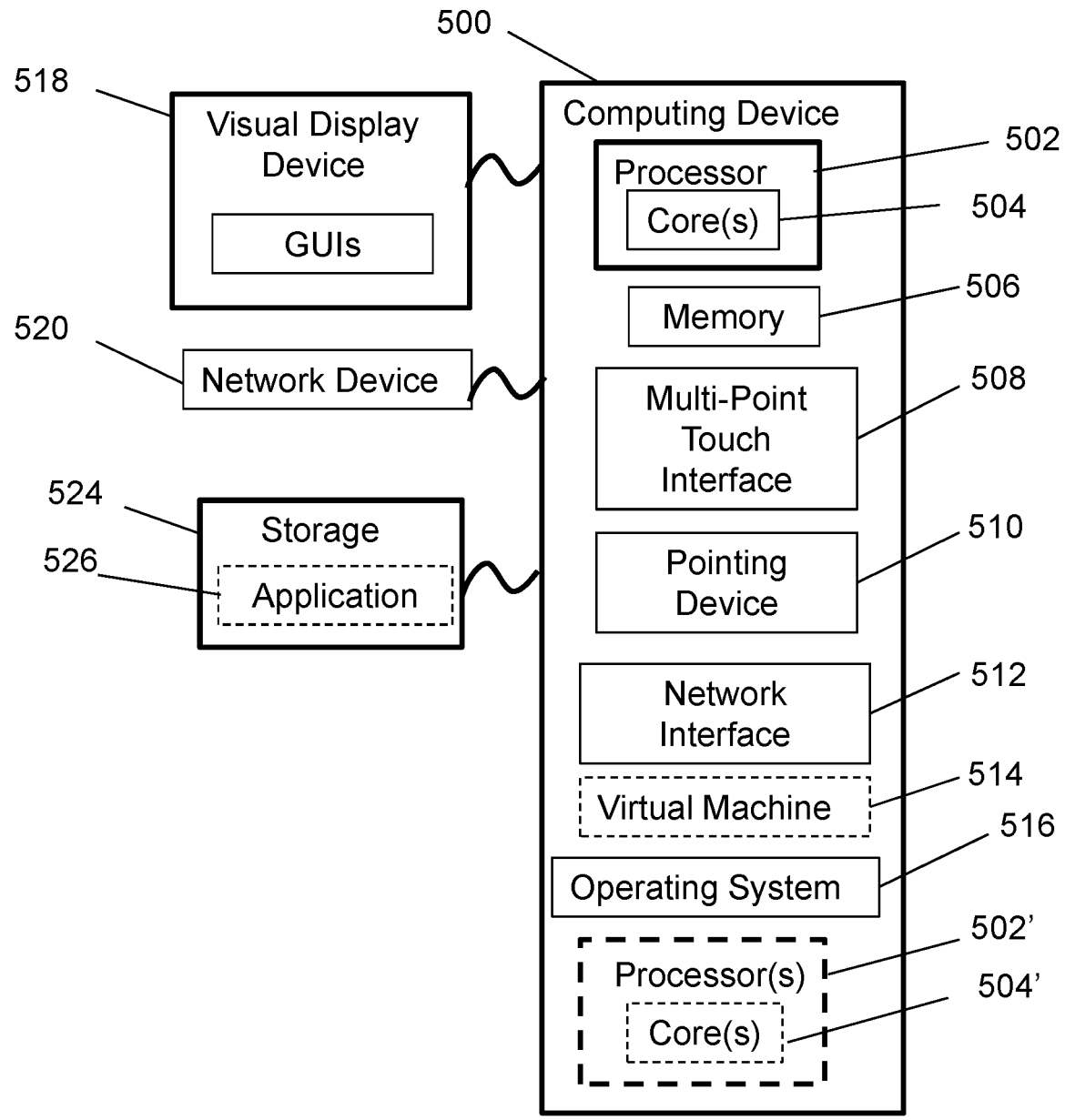
FIG. 5 is a block diagram of an exemplary computing device for implementing one or more user devices in accordance with embodiments of the present disclosure.

The distributed computing system 210 can facilitate a multi-user, multi-tenant environment that can be accessed concurrently by user devices 250. For example, the user devices 250 can be operatively coupled to one or more of the severs 214 and/or the data storage devices 216 via a communication network 290, which can be the Internet, a wide area network (WAN), local area network (LAN), and/or other suitable communication network. The user devices 250 can execute client-side applications 252 to access the distributed computing system 210 via the communications network 290. The client-side application(s) 252 can include, for example, a web browser and/or a specific application (e.g., a mobile application). An exemplary user device is depicted in FIG. 5.

In exemplary embodiments, the user devices 250 can initiate communication with the distributed computing system 210 via the client-side applications 252 to establish communication sessions with the distributed computing system 210 that allows each of the user devices 250 to utilize the consuming application(s) 104 to access, view, and modify the interrelated units of data 218 (e.g., data items or elements) stored by the data storage devices 216, as described herein. For example, in response to the user device 250*a* accessing the distributed computing system 210, the server 214*a* can launch an instance of the consuming application 104, which in turn can call or request the engine 150, an instance of which can be launched on server 214*b* or collectively across a group of the servers 214. In embodiments which utilize multi-tenancy, if an instance of the engine 150 has already been launched, the instance can process changes to data for multiple users.

Upon being launched, the engine 150 can identify the current state of the interrelated units of data stored in memory locations of one or more of the data storage devices 216, identify dependencies between the interrelated units of data, e.g., to associate the interrelated units of data with vertices/fields of an implied or explicit directed acyclic graph, and separate the interrelated units of data into groups based on the dependencies between the interrelated units of data and/or a configuration of the consuming application 104 that calls or requests the engine 150. For example, the server 214*b* can read the interrelated units of data from the data storage devices 216 and can store the current state of the interrelated units of data in one or more memory devices across one or more of the servers 214 to create a cache of the state. Based on the cached state, the server 214*b* can extract the dependencies between the interrelated units of data to form the implied or explicit directed acyclic graph. The server 214*b* can separate the directed acyclic graph into boundaries based on the dependencies between the interrelated units of data and/or whether the consuming application is configured to concurrent display the interrelated units of data to one or more users.

Because the directed acyclic graph is based on the dependencies between the interrelated units of data and the boundaries are based on the dependencies between the interrelated units of data and/or a configuration of the consuming application 104, the graph and boundaries for a given data set can be changed by the engine 150 dynamically as the interrelated units of data change and/or as the consuming application changes. The engine 150 can be seamlessly implemented for different data sets being consumed by different types of application (i.e., the engine 150 is independent of and agnostic to the type of interrelated data and the type of application consuming the interrelated data). This allows the specific interrelated data and application consuming the interrelated data to dictate the form of the graph and the location of the boundaries within the graph.

For example, users, via the user devices 250, can upload a set of interrelated data to the distributed computer system, and one or more of the servers 214 can store the units of data (e.g., data items or elements) in the set across the data storage devices (i.e., in memory locations of the data storage devices 216) and specify a particular consuming application that will consume the data set. The data engine 150 can associate the units of data in the set with one or more vertices/fields of an implied directed acyclic graph (e.g., each vertex/field can include a value) having directed edges that correspond to the dependencies between the vertices/fields and can designate boundaries for portions of the directed acyclic graph such that each boundary includes a subset of the data set based on how the application consuming the data set will use and/or present the data set in one or more graphical user interfaces. Each value of the one or more vertices/fields can be imported into the engine 150 from their respective memory locations to generate a current state for the data set which can be cached in the memory of one or more of the server 214.

A user can subsequently interact with the consuming application, e.g., via the client-side application to modify one of the units of data in the set. In response to the modification to the unit of data, the consuming application 104 can call or request the engine 150 to update the unit of data stored in the data storage device(s) based on the modification, which can be imported to the engine 150 from the consuming application. The engine 150 can determine within which boundary the modified unit of data resides and can identify the dependencies between other units of data in the boundary and the modified unit of data, and can enter into an ACI transaction (a series of operations utilizing the properties of atomicity, consistency, and isolation) to update the modified unit of data and each of the other units of data in the boundary that depend, directly or indirectly on the modified unit of data.

For example, the server(s) performing the ACI transaction can restrict access to the memory locations in the data storage devices that store the affected units of data within the boundary or that store each of the units of data associated with the boundary. Restricting access to the memory locations can prevent concurrent access to the storage location of the affected units of data until the ACI transaction is complete and can prevent the consuming application from updating the user interface to display an intermediate unreliable state of the units of data within the boundary to users. As one non-limiting example, the server(s) can restrict access to affected memory locations by locking the affected memory locations to prevent reads or writes from occurring with respect to the locked memory locations. As another non-limiting example, the servers(s) can restrict access to the memory locations by creating a copy of the content/values of affected memory locations to other memory locations and can redirect reads or writes (e.g., via pointers) to the other memory locations. In some embodiments, the server(s) processing the changes to the data stored at the affected memory locations can be overwritten as the changes of processed. In some embodiments, the changes can be stored in a cache or other specified storage locations and the changes can be written to the affected memory locations by copying the updated data from the cache or other specified storage location to the affected memory locations. Before the ACI transaction can be completed, the server performing the ACI transaction can require that all the affected units of data are updated successfully. The server(s) performing the ACI transaction can update the state of the units of data that depend from each previously updated unit of data within the boundary, e.g., by performing a series of calculations to generate new values for the affected units of data within the boundary. The updated state can be stored in the cache until the ACI transaction is complete. Upon completion of the ACI transaction, the server(s) performing the ACI transaction can overwrite the memory locations in the data storage devices corresponding to the affected units of data based on the updated state, at which time the server(s) performing the ACI transaction can derestrict (e.g., unlock) the memory locations to allow the consuming application to update the user interface to reflect any modified units of data being rendered by the user interface to allow users viewing the affected units of data to view modified units of data.

While the server(s) performing the ACI transaction applies atomicity, consistency, and isolation to the units of data during the ACI transaction for a given boundary, the server(s) performing the ACI transaction does not extend the atomicity, consistency, and isolation requirements of the ACI transaction to units of data outside of the boundary; thereby limiting the restriction (e.g., locking) of the memory locations and the size of the transaction based on the boundary. This can advantageously reduce the likelihood of data access contentions, facilitate efficient allocation of computer resources including processor resources and memory resources based on the execution boundaries, and/or enable scaling in the distributed computing system 210 as the quantity of data increases. Upon completion of the transaction, the engine 150 can be executed by the server(s) to update one or more vertices/fields in the directed acyclic graph to reflect the updated units of data and adjust the boundaries if the changes to the units of data effects the boundaries.

When units of data in another boundary depend, directly or indirectly, on one or more of the modified units of data in the boundary, the engine 150 can executed to initiate another separate ACI transaction to update the units of data that depend, direct or indirectly, on the modified units of data from associated with the boundary, which can be performed asynchronously from the ACI transaction performed to update data items within the boundary. By performing ACI transactions based on the boundaries within the graph, instead of performing a single transaction to update all of the affected data in a data set, which can result in a large number of memory locations being restricted (e.g., locked) and a large number of resources being required for updating the data, exemplary embodiments of the engine 150 can be executed to generate separate ACI transactions for each boundary, where each transaction can be performed asynchronously with respect to each other. As a result, less memory locations may be restricted (e.g., locked) at any given time, a duration of time each memory location is restricted (e.g., locked) can be reduced, and efficient allocation of computing resources can be achieved; thereby providing for less contentions for memory and/or processor resources.

In exemplary embodiments, in response to receiving a change to the data in a first one of the groups/subsets of data within a boundary, the engine 150 can allocate a first set of the processing devices including one or more processing devices to modify the data in the first one of the groups as an atomic, consistent, and isolated transaction based on the dependencies between the data. When the dependencies between the data extend to other groups/subsets of data in others boundaries, the engine 150 can allocate a further sets of processing devices including one or more processing device for each boundary to modify the data in the other groups/subsets of data as independent and distinct atomic, consistent, isolated transactions based on the changes made to the data in the first group upon which the data in the second group depends. The engine 150 can perform the new atomic, consistent, isolated transactions asynchronously from the transaction and can perform the new transactions in parallel using different computer resources.

Figure 3:
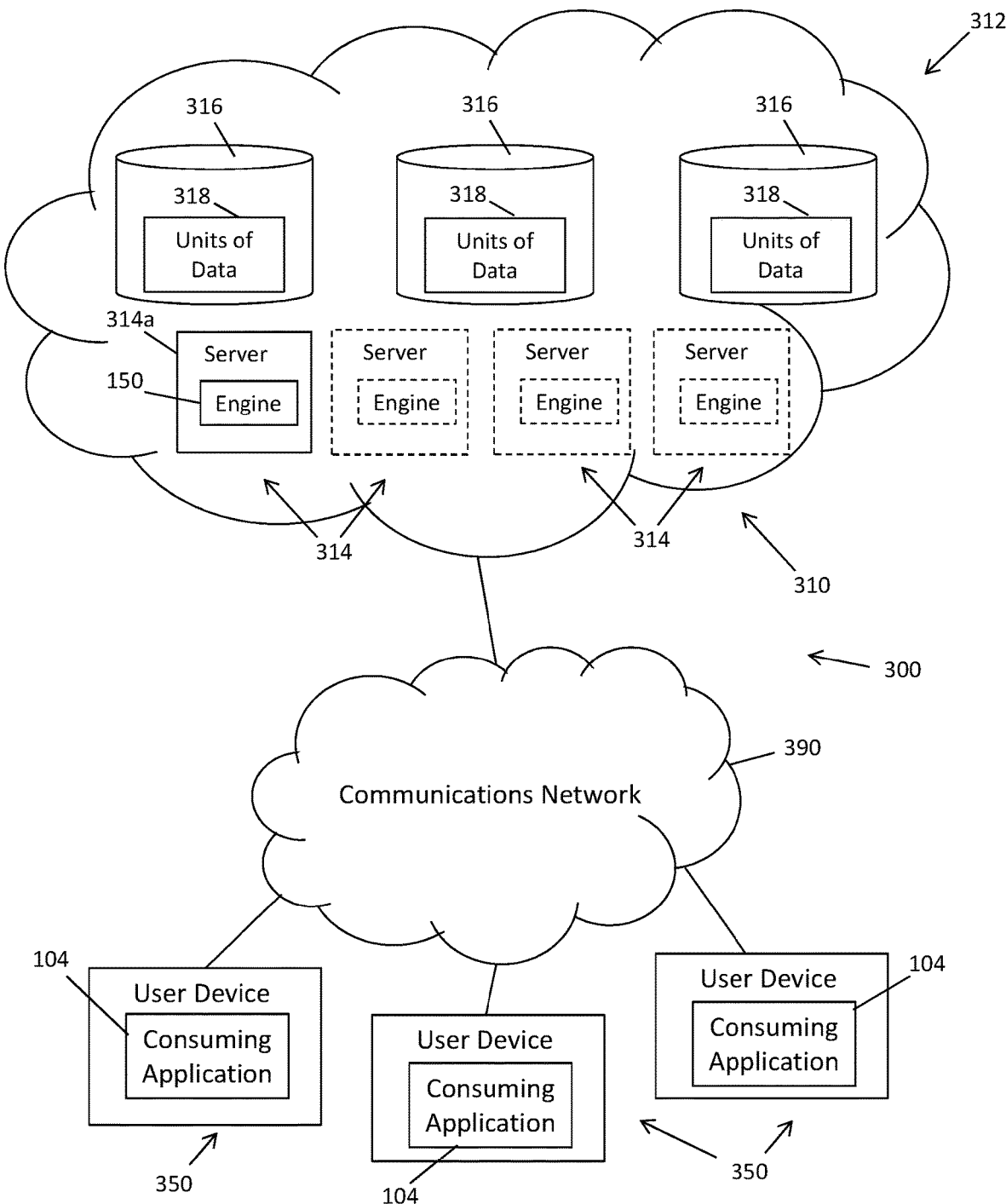
FIG. 3 is a block diagram of another distributed computing environment within which embodiments of the present disclosure can be implemented.

FIG. 3 shows a distributed computing environment 300 within which embodiments of the present disclosure can be implemented. As shown in FIG. 3, the environment 300 can include distributed computing system 310 including shared computer resources 312, such as servers 314 and (durable) data storage devices 316, which can be operatively coupled to each other. For example, two or more of the shared computer resources 312 can be directly connected to each other or can be connected to each other through one or more other network devices, such as switches, routers, hubs, and the like. Each of the servers 314 can include at least one processing device and each of the data storage devices 316 can include memory for storing units of data 318 (e.g., data items and/or elements) in one or more sets of data, as described herein. Any one of the servers 314 can implement instances of the engine 150 or portions thereof. In some embodiments, one or more of the servers 214 can be a dedicated computer resource for implementing the engine 150. In some embodiments, one or more of the servers 214 can be dynamically grouped to collectively implement embodiments of the engine 150. In some embodiments, one or more servers can dynamically implement different instances of the engine 150.

The distributed computing system 310 can facilitate a multi-user, multi-tenant environment that can be accessed concurrently by user devices 350. For example, the user devices 350 can be operatively coupled to one or more of the severs 314 and/or the data storage devices 316 via a communication network 390, which can be the Internet, a wide area network (WAN), local area network (LAN), and/or other suitable communication network. The user devices 350 can execute instances of the consuming application(s) 104 to access the distributed computing system 210 via the communications network 290.

In exemplary embodiments, the user devices 350 can initiate communication with the distributed computing system 310 via the consuming application(s) 104 to establish communication sessions with the distributed computing system 310 that allows each of the user devices 350 to access, view, and modify the units of data (e.g., data items or elements) stored by the data storage devices 316, as described herein. For example, in response to the user device 352a accessing the distributed computing system 310, the consuming application 104 can call or request the engine 150, an instance of which can be launched on server 314a or collectively across a group of the servers 314. In embodiments which utilize multi-tenancy, if an instance of the engine 150 has already been launched, the instance can process changes to data for multiple users. The server(s) executing the engine 150 can identify the current state of the units of data stored in memory locations of one or more of the data storage devices 316, identify dependencies between the units of data, e.g., to associate the units of data with vertices/fields of an implied or explicit directed acyclic graph, and separate the units of data into groups based on the dependencies between the units of data and/or a configuration of the consuming application 104 that called or requested the engine 150.

A user can interact with the consuming application 104 to modify one of the units of data in the data set. In response to the modification to the unit of data, the consuming application 104 can call or request the engine 150 to update the state of the units of data in the data storage devices based on the modification. The engine 150 can determine within which boundary the modified unit of data resides and can identify the dependencies of the units of data within the boundary including the modified unit of data and can enter into an ACI transaction to update the modified unit of data and each of the other unit of data within the boundary that depend, directly or indirectly on the modified data item or element, as described herein (e.g., with respect to FIGS. 1 and 2). An additional ACI transactions can be performed asynchronously to the ACI transaction and to each other for each of the other boundaries that include units of data that depends, directly or indirectly, on the modified unit of data, as described herein.

FIG. 4 is a block diagram of an exemplary computing device 400 for implementing one or more of the servers in accordance with embodiments of the present disclosure. In the present embodiment, the computing device 400 is configured as a server that is programmed and/or configured to execute one of more of the operations and/or functions for embodiments of the environment described herein (e.g., application(s) 104 and/or engine 150) and to facilitate communication with the user devices described herein (e.g., user device(s) 250 and 350). The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the components/modules or portions thereof described herein as being implemented, for example, by the servers 214 and/or 314, and/or can provide a cache for maintaining the state of the units of data stored by one or more data storage devices operatively coupled to the computing device 400. The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device may be shared dynamically. One or more virtual machines 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

The computing device 400 may include or be operatively coupled to one or more data storage devices 424, such as a hard-drive, CD-ROM, mass storage flash drive, or other computer readable media, for storing data (e.g., data items or elements described herein) and computer-readable instructions and/or software that can be executed by the processing device 402 to implement exemplary embodiments of the components/modules described herein with reference to the servers 214 and/or 314.

The computing device 400 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. While the computing device 400 depicted in FIG. 4 is implemented as a server, exemplary embodiments of the computing device 400 can be any computer system, such as a workstation, desktop computer or other form of computing or telecommunications device that is capable of communication with other devices either by wireless communication or wired communication and that has sufficient processor power and memory capacity to perform the operations described herein.

The computing device 400 may run any server application 416, such as any of the versions of server applications including any Unix-based server applications, Linux-based server application, any proprietary server applications, or any other server applications capable of running on the computing device 400 and performing the operations described herein. An example of a server application that can run on the computing device includes the Apache server application.

FIG. 5 is a block diagram of an exemplary computing device 500 for implementing one or more of the user devices (e.g., user device 250 and/or 350) in accordance with embodiments of the present disclosure. In the present embodiment, the computing device 500 is configured as a client-side device that is programmed and/or configured to execute one of more of the operations and/or functions for embodiments of the environment described herein (e.g., client-side applications 252 and/or consuming applications 104) and to facilitate communication with the servers described herein (e.g., servers 214 and 216). The computing device 500 includes one or more non-transitory computer-readable media for storing one or more computer-executable instructions or software for implementing exemplary embodiments of the application described herein (e.g., embodiments of the client-side applications 252 and/or consuming applications 104). The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions, code or software for implementing exemplary embodiments of the client-side applications 252 and/or consuming applications 104 or portions thereof.

The computing device 500 also includes configurable and/or programmable processor 502 and associated core 504, and optionally, one or more additional configurable and/or programmable processor(s) 502' and associated core (s) 504' (for example, in the case of computer systems having multiple processors/cores), for executing computer-readable and computer-executable instructions, code, or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, MRAM, EDO RAM, and the like. Memory 506 may include other types of memory as well, or combinations thereof.

A user may interact with the computing device 500 through a visual display device 518, such as a computer monitor, which may be operatively coupled, indirectly or directly, to the computing device 500 to display one or more of graphical user interfaces that can be provided by the client-side applications 252 and/or the consuming applications 104 in accordance with exemplary embodiments. The computing device 500 may include other I/O devices for receiving input from a user, for example, a keyboard or any suitable multi-point touch interface 508, and a pointing device 510 (e.g., a mouse). The keyboard 508 and the pointing device 510 may be coupled to the visual display device 518. The computing device 500 may include other suitable I/O peripherals.

The computing device 500 may also include or be operatively coupled to one or more storage devices 524, such as a hard-drive, CD-ROM, or other computer readable media, for storing data and computer-readable instructions, executable code and/or software that implement exemplary embodiments of an application 526 or portions thereof as well as associated processes described herein.

The computing device 500 can include a network interface 512 configured to interface via one or more network devices 520 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the processes and/or operations described herein.

The computing device 500 may run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the processes and/or operations described herein. In exemplary embodiments, the operating system 516 may be run in native mode or emulated mode. In an exemplary embodiment, the operating system 516 may be run on one or more cloud machine instances.

Figure 6:
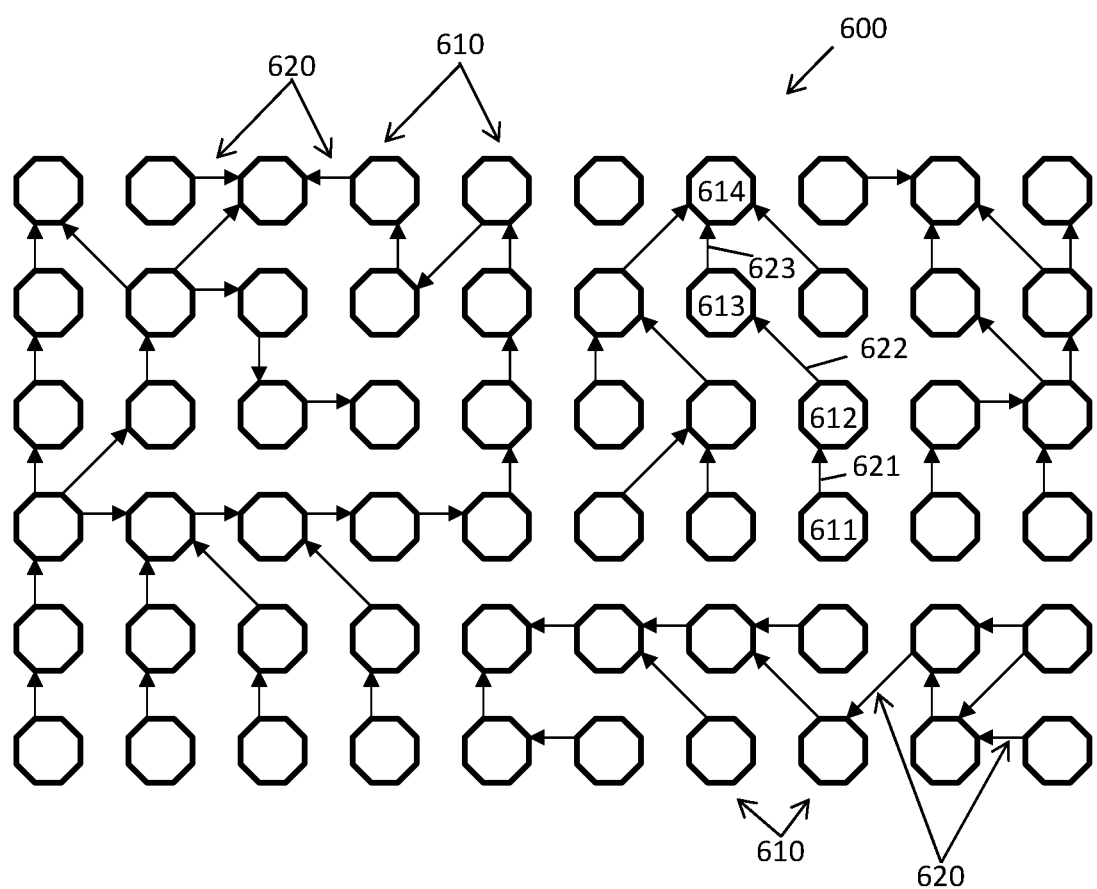
FIG. 6 is an illustrative example of a graphical representation of a directed acyclic graph that can be formed implicitly or explicitly in accordance with embodiments of the present disclosure.

FIG. 6 is an illustrative example of a graphical representation of a directed acyclic graph 600 that can be formed implicitly or explicitly by exemplary embodiments of the present disclosure. As shown in FIG. 6, the graph 600 can include vertices 610 and directed edges 620, where the vertices 610 correspond to units of data (e.g., data items or elements) including literal values and/or expressions and the edges 620 correspond to dependencies between the units of data represented by the vertices 610. As described herein, embodiments of the engine described herein can form the graph by identifying the dependencies between the units of data. The direction of the edges 620 can indicate the relationship between the nodes. For example, the edge 621 between vertices 611 and 612 indicates that the vertex 612 represents a unit of data that depends on the unit of data represented by the vertex 611 such that a change to the unit of data represented by the vertex 611 triggers a change to the unit of data represented by the vertex 612.

The vertices 610 and edges 620 can form paths that can be followed by the engine 150 when updating the data according to the graph 600. For example, vertex 611 is not dependent on any other vertices 610 in the graph 600, and therefore forms a starting point of a path. A single edge 621 extends from the vertex 611 to the vertex 612. In the event that a user modifies the unit of data represented by the vertex 611, the engine can follow the path to the vertex 612 via the edge 621 to update the unit of data represented by the vertex 612 based on the modified unit of data represented by the vertex 611. Subsequently, the engine can continue by updating the next unit of data in the path represented by the vertex 613, which is connected to the vertex 612 by the edge 622, based on the updated unit of data represented by the vertex 612. Finally, the unit of data represented by the vertex 614, which is connected to the vertex 613 by the edge 623, can be updated based on the updated unit of data represented by the vertex 613. Since no other vertices in the graph depend on the vertex 614, the node 614 represents the end of the path between the vertices 611 and 614. Because the graph 600 is a directed acyclic graph, the graph 600 does not include any paths that form a loop (e.g., a vertex cannot be present in any given path more than once).

Figure 7:
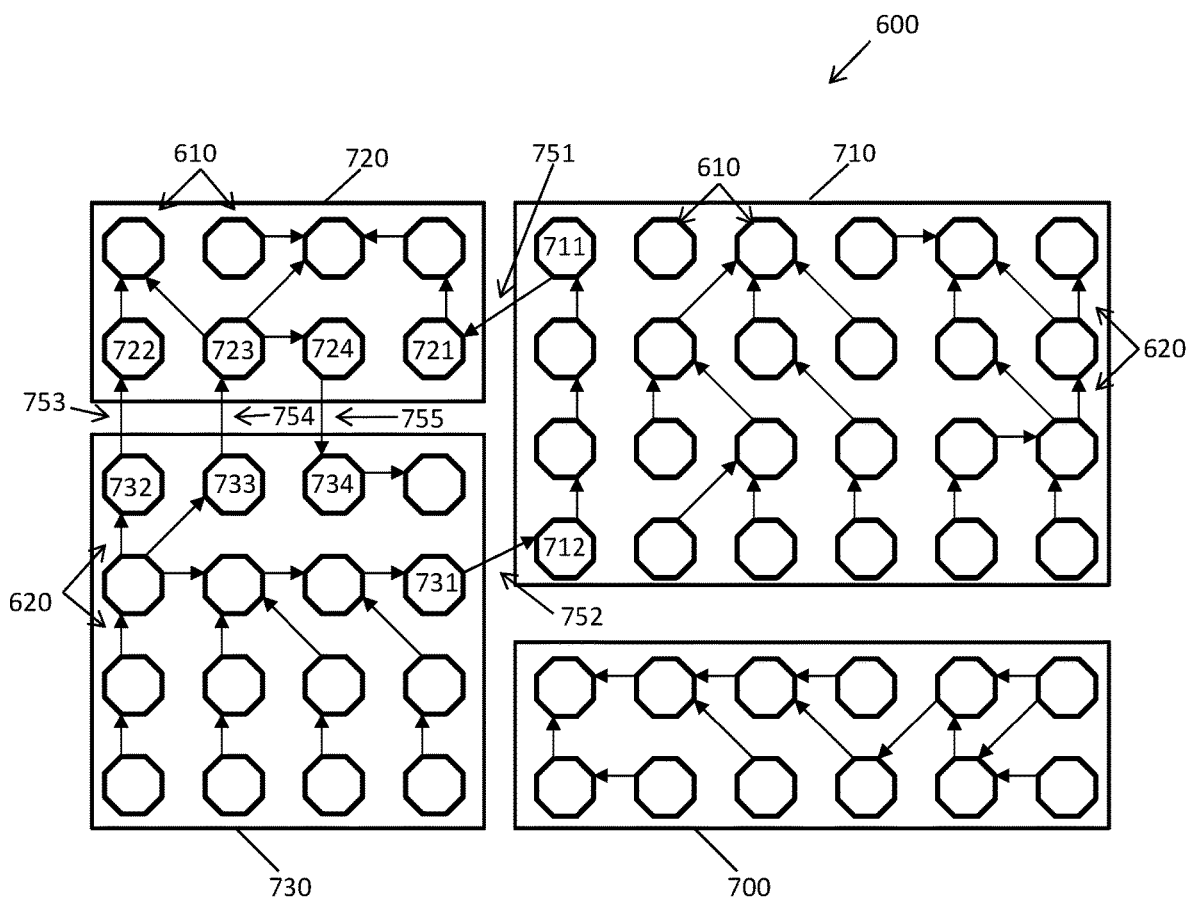
FIG. 7 is an illustrative example of boundaries that can be formed within the directed acyclic graph shown in FIG. 6 in accordance with embodiments of the present disclosure.

FIG. 7 is an illustrative example of boundaries that can be formed within the directed acyclic graph 600 in accordance with exemplary embodiments of the present disclosure. As shown in FIG. 7, boundaries 700, 710, 720, and 730 can be formed to encompass groups/subsets of the vertices 610 based on the application consuming the units of data represented by the vertices 610 and/or a dependency between the units of data. For example, the boundaries 700, 710, 720, and 730 can be formed based on a configuration of the consuming application, such as how the consuming application presents the units of data to users via the user interface.

The boundary 700 can represent a self-contained group/subset of data, e.g., the vertices 610 in the boundary 700 do not depend on any other vertices and no other vertices outside of the boundary 700 depend in any of the vertices within the boundary 700. Each of the boundaries 710, 720, and 730 can be dependent on and/or depended on by vertices from other boundaries. As one example, edge 751 can cross from the boundary 710 into the boundary 720 to connect vertices 711 and 721 indicating that the unit of data represented by the vertex 721 depends on the unit of data represented by the vertex 711. As another example, edge 752 can cross from the boundary 730 into the boundary 710 to connect vertices 731 and 712 indicating that the unit of data represented by the vertex 712 depends on the unit of data represented by the vertex 731. As another example, each of the edges 753-755 can cross between the boundaries 720 and 730 to connect vertices in the boundaries 720 and 730 to indicate that the units of data depends on or are depended on by other units of data (e.g., vertex 722 depend on vertex 732; vertex 723 depends on vertex 733; and vertex 734 depends on vertex 724).

Figure 8:
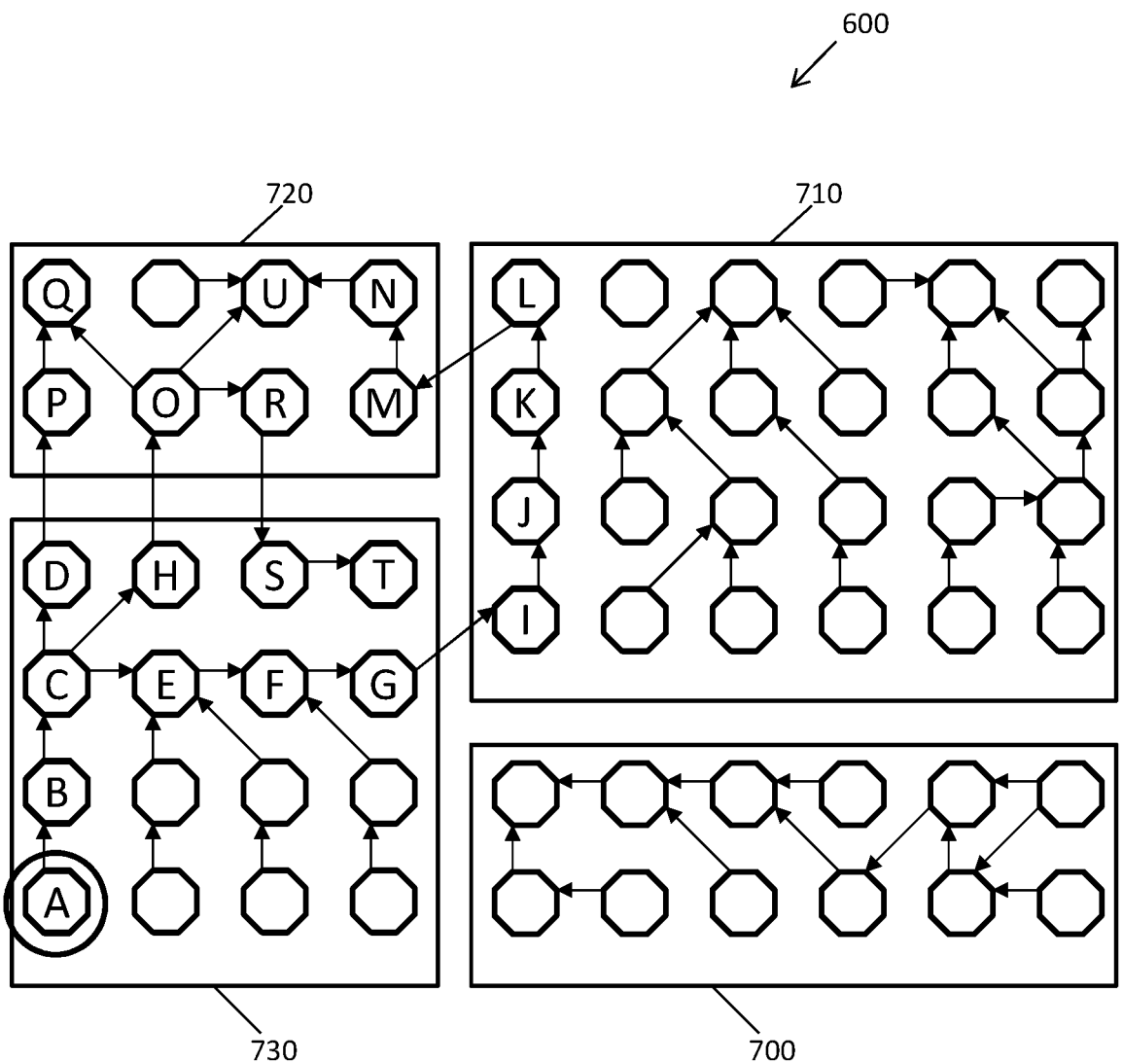
FIG. 8 is an illustrative example of a propagation of changes to interrelated data in one or more data sets in accordance with embodiments of the present disclosure.

FIG. 8 is an illustrative example of a propagation of changes to units of data in a data set represented by example as the directed acyclic graph 600 with boundaries 700, 710, 720, and 730 according to exemplary embodiments of the present disclosure. As shown in FIG. 8, a user via the consuming application can change the unit of data represented by vertex A (e.g., can change a value of the unit of data). In response to this event, rather than implementing a single ACI transaction for affected units of data in the graph 600, embodiments of the engine can allocate one or more processing devices and memory devices from the shared computer resources to perform a series of independent and asynchronous ACI transactions to update the affected units of data within the graph based on the boundaries 700, 710, 720, and 730, where each ACI transaction can be initiated in response to separate and distinct events (at different times) resulting from the propagation of changes to the units of data represented by the vertices in the graph 600. For example, a first transaction in the series can be triggered in response to a first event corresponding to the change in the unit of data represented by the vertex A, while other ACI transactions in the graph 600 can be trigger by other events related to the first event such as the propagation of changes to the units of data across the boundaries 700, 710, 720, and 730 based on the dependencies between the units of data.

To perform the first ACI transaction in response to the change to the unit of data represented by the vertex A, the engine can allocate a first set of shared computer resources including one or more processing devices and memory devices. The first ACI transaction can include a series of operations to update the unit of data included in vertex A and to update each unit of data that depends, directly or indirectly, on the unit of data represented by the vertex A, which in the present example include vertices B-H. As shown in FIG. 8, three paths (vertices A-D; vertices A-C and E-G; and vertices A-C and H) are defined based on the dependencies between the units of data represented by vertices A-H. As part of the ACI transaction associated with boundary 730, the one or more processing devices executing the first ACI transaction can lock memory locations in the memory devices at which the units of data represented by vertices A-H are stored, while memory locations represented by other vertices in the graph remain unlocked. Alternatively, exemplary embodiments of the present disclosure can lock memory locations at which each of the units of data represented by the vertices within boundary 730 are stored.

Once the memory locations are locked, the one or more processing devices performing the first ACI transaction can update the unit of data represented by vertex A, can subsequently update the unit of data represented by the vertex B based on the change to the unit of data represented by vertex A, and can subsequently update the unit of data represented by vertex C based on the changes to the unit of data represented by the vertex B. Continuing to follow the three paths based on the dependencies represented by the edges between the vertices, the processing device performing the first ACI transaction can update the units of data represented by vertices D, E-G, and H in parallel or sequentially. When there are no further changes to the units of data to be made during the first ACI transaction, the one or more processing devices can complete the transaction and unlock the memory locations that were locked during the first ACI transaction.

As shown in FIG. 8, the units of data represented by the vertices P and 0 in the boundary 720 depend on the units of data represented by vertices D and H, respectively, and the unit of data represented by vertex I depends on the unit of data represented by vertex G. Therefore, when the units of data represented by the vertices D, H, and G change (e.g., as part of the first ACI transaction), the units of data represented by the vertices P, O, and I, respectively, have to be updated to maintain reliable and consistent data in the system. The propagation of changes across the boundaries (e.g., from boundary 730 to 720 and from boundary 730 to 710) can represent events that trigger the performance of new ACI transactions in the series.

As an example, in response to the changes to the units of data represented by vertices D and H, the engine can allocate a second set of shared computer resources including one or more processing devices and memory devices to perform a second ACI transaction. The second ACI transaction can include a series of operations to update the units of data included in vertices P and 0 and to update each unit of data that depends, directly or indirectly, on the units of data represented by the vertices P and 0, which in the present example include vertices Q and R. As part of the second ACI transaction associated within boundary 720, the one or more processing devices executing the second ACI transaction can lock memory locations in the memory devices at which the units of data represented by vertices O-R are stored. Alternatively, exemplary embodiments of the present disclosure can lock memory locations at which each of the units of data represented by the vertices within boundary 720 are stored. When there are no further changes to the units of data to be made during the second ACI transaction, the one or more processing devices can complete the transaction and unlock the memory locations that were locked during the second ACI transaction.

As another example, in response to the changes to the units of data represented by the vertex G, the engine can allocate a third set of shared computer resources including one or more processing devices and memory devices to perform a third ACI transaction. The third ACI transaction can include a series of operations to update the units of data included in vertex I and to update each unit of data that depends, directly or indirectly, on the units of data represented by the vertex I, which in the present example include vertices J-L. As part of the third ACI transaction associated within boundary 710, the one or more processing devices executing the third ACI transaction can lock memory locations in the memory devices at which the units of data represented by vertices I-L are stored. Alternatively, the one or more processing devices can lock memory locations at which each of the units of data represented by the vertices within boundary 710 are stored. When there are no further changes to the units of data to be made during the third ACI transaction, the one or more processing devices can complete the transaction and unlock the memory locations that were locked during the third ACI transaction.

The continued propagation of changes resulting from the initial modification of the unit of data represented by the vertex A can continue through the graph resulting in the generation of additional events that trigger additional ACI transactions in the series of ACI transactions. As an example, during the second ACI transaction for the boundary 720, the unit of data represented by vertex R can be updated, which can trigger a change to the unit of data represented by the vertex S in the boundary 730, resulting in the generation of a fourth ACI transaction. The fourth ACI transaction can include a series of operations to update the units of data included in the vertex S and to update each unit of data that depends, directly or indirectly, on the units of data represented by the vertex S, which in the present example includes the vertex T. As part of the fourth ACI transaction associated with boundary 730, the one or more processing devices executing the fourth ACI transaction can lock memory locations in the memory devices at which the units of data represented by vertices S and T are stored. Alternatively, exemplary embodiments of the present disclosure can lock memory locations at which each of the units of data represented by the vertices within boundary 730 are stored. When there are no further changes to the units of data to be made during the fourth ACI transaction, the one or more processing devices can complete the transaction and unlock the memory locations that were locked during the fourth ACI transaction.

As another example, during the third ACI transaction, the unit of data represented by the vertex L can be updated, which can trigger a change to the unit of data represented by the vertex M in the boundary 720, resulting in the generation of a fifth ACI transaction. The fifth ACI transaction can include a series of operations to update the units of data included in the vertex M and to update each unit of data that depends, directly or indirectly, on the units of data represented by the vertex M, which in the present example includes the vertices N and U. As part of the fifth ACI transaction associated with boundary 720, the one or more processing devices executing the fifth ACI transaction can lock memory locations in the memory devices at which the units of data represented by vertices M, N, and U are stored. Alternatively, exemplary embodiments of the present disclosure can lock memory locations at which each of the units of data represented by the vertices within boundary 720 are stored. When there are no further changes to the units of data to be made during the fifth ACI transaction, the one or more processing devices can complete the transaction and unlock the memory locations that were locked during the fifth ACI transaction.

In exemplary embodiments, the engine can control an operation of the shared resources to allocate the first through fifth ACI transactions to the processing devices and can also control when the first through fifth ACI transactions are performed. For example, one or more of the ACI transaction can be performed in parallel, concurrently, or consecutively. Performance of the ACI transactions can be scheduled based on whether the memory locations storing units of data to be changed have been locked by one or more processing device already performing an ACI transaction. In some embodiments, one or more of the ACI transaction can be queued when an ACI transaction that is already being performed has locked memory location that need to be accessed by the one or more ACI transactions.

While the memory locations have been described as being locked and/unlocked in exemplary embodiments (e.g., as described in FIGS. 8-13, exemplary embodiments can restrict access to the memory locations using one or more techniques that maintain linearizability consistency. As one example, access to the memory locations can be restricted by creating a copy of the data stored in the memory locations and storing the copied data to specified data locations or a cache. Using this approach all reads to the memory locations can be redirected to the specified memory locations or cache at which the copied data is stored, while writes can occur to the memory locations at which the original data is stored. Once the writes are complete, and as a final step in the transaction, the copied data can be eliminated, and subsequent reads can again be directed to the memory locations at which the original (now modified) data is stored to view and/or use the modified data that was written. This approach can keep linearizability consistency and can allow for concurrent reads and a single write to execute concurrently. In some embodiments, reads can be redirected to the specified memory locations or cache by pointers. The pointers can be static (e.g., the same) for every transaction or can be dynamically generated for every transaction. In some embodiments, the pointers can be created by one or more processors during a transaction and can be deleted when the transaction is complete.

Figure 9:
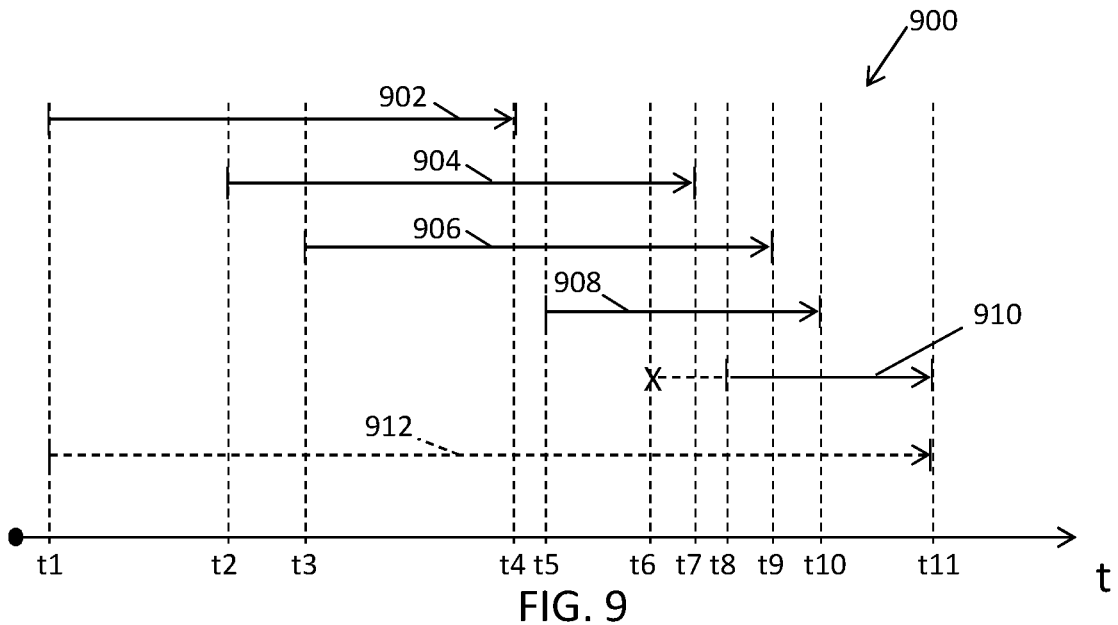
FIG. 9 shows an exemplary timing diagram to illustrate an exemplary performance of the operations described with reference to FIG. 8.

FIG. 9 shows an exemplary timing diagram 900 to illustrate an exemplary performance of the first through fifth ACI transaction described with reference to FIG. 8. As shown in FIG. 9, the axis, t, corresponds to time, the line 902 corresponds to the first ACI transaction, the line 904 corresponds to the second ACI transaction, the line 906 corresponds to the third transaction, the line 908 corresponds to the fourth ACI transaction, and the line 910 corresponds to the fifth ACI transaction. The line 912 corresponds to the total time $(t_1-t_9)$ required to complete the updating of all affected units of data in the data set.

As shown in FIG. 9, the first ACI transactions for the boundary 730 can begin at a time, $t_1$, and can be completed at a time, $t_4$. During the pendency, and as a result, of the first ACI transaction, events can occur at times $t_2$ and $t_3$, at which times the second and third ACI transactions can be begin, respectively. Because the first, second, and third ACI transactions occur in separate boundaries, the memory locations locked by the first, second, and third transactions do not overlap (e.g., each transaction locks distinct memory locations) and the first, second, and third ACI transactions can occur in parallel. For example, the engine can allocate a first processing device of a first server to perform the first ACI transaction, allocation a second processing device of a second server to perform the second ACI transaction, and can allocate a third processing device of a third server to perform the third ACI transaction. When the first ACI transaction is completed at time $t_4$, the first processing device can unlock the memory locations that were locked for the first ACI transaction.

During the pendency, and as a result, of the second ACI transaction (shown as line 904), an event can occur at time $t_5$, at which time the fourth ACI transaction can be begin. At time $t_5$, the third ACI transaction can also still be pending, but the first ACI transaction has been completed. Because the second, third, and fourth ACI transactions occur in separate boundaries, and the first ACI transaction is already completed, the memory locations required to complete the fourth transaction are not locked by any other pending transactions and the second, third, and fourth ACI transactions can occur in parallel. For example, the second processing device of the second server continues to perform the second ACI transaction, the third processing device of the third server continues to perform the third ACI transaction, and the engine can allocate the first processor of the first server to process the fourth transaction.

During the pendency, and as a result, the third ACI transaction (shown as line 906), an event can occur at time $t_6$, for which the fifth ACI transaction is generated. In the present example, embodiments of the engine can be configured such that all memory locations within a given boundary are locked when performing a transaction in the given boundary. At time $t_6$, the second ACI transaction is still pending. Because the second and fifth ACI transactions are performed for the same boundary (i.e. the boundary 720), the fifth ACI transaction can be queued by the engine until the second ACI transaction has been completed, which occurs at time $t_7$. For example, the fifth ACI can begin at time $t_8$ after the second ACI transaction has been completed and the memory location locked by the second ACI transaction are unlocked. In alternative embodiments, in which only those memory location corresponding to the units of data to be updated during a given transaction are locked, the fifth ACI transaction can begin when the event occurs at $t_6$, and while the second ACI transaction is pending, because the second and fifth ACI transaction do not update the same units of data (i.e. do not update the same memory locations). The third, fourth, and fifth transactions can be completed at times $t_9$, $t_{10}$, and $t_{11}$, respectively.

Figure 10:
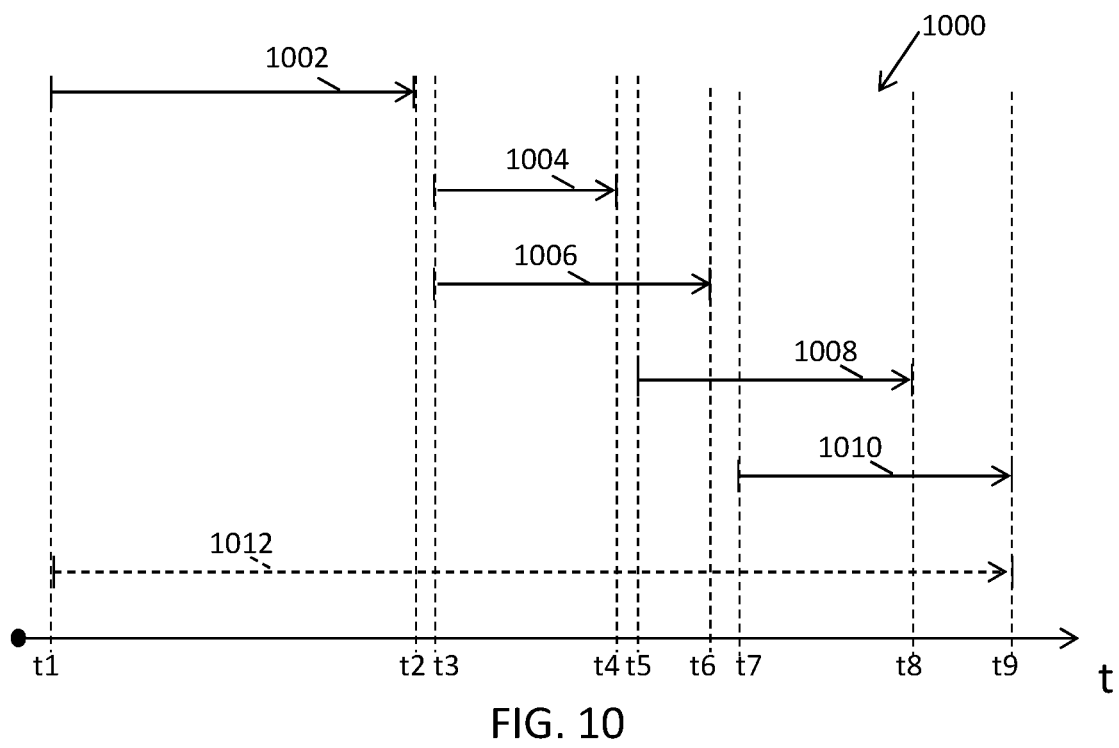
FIG. 10 shows another exemplary timing diagram to illustrate an exemplary performance of operations described with reference to FIG. 8.

FIG. 10 shows another exemplary timing diagram 1000 to illustrate an exemplary performance of the first through fifth ACI transactions described with reference to FIG. 8. As shown in FIG. 10, the axis, t, corresponds to time, the line 1002 corresponds to the first ACI transaction, the line 1004 corresponds to the second ACI transaction, the line 1006 corresponds to the third transaction, the line 1008 corresponds to the fourth ACI transaction, and the line 1010 corresponds to the fifth ACI transaction. The line 1012 corresponds to the total time $(t_1-t_9)$ required to complete the updating of all affected units of data in the data set.

As shown in FIG. 10, the first ACI transaction for the boundary 730 can begin at a time, $t_1$, and can be completed at a time, $t_2$. Upon completion of the first ACI transaction, and as a result of the first ACI transaction, events can be generated that result in beginning the second and third ACI transactions (e.g., at time $t_3$). In the present example, because the second and third ACI transactions occur in separate boundaries, the memory locations locked by the second and third transactions do not overlap (e.g., each transaction locks distinct memory locations) and the second and third ACI transactions can occur in parallel. For example, the engine can allocate a first processing device of a first server to perform the second ACI transaction, and can allocate a second processing device of a second server to perform the third ACI transaction.

Upon completion of the second ACI transaction at time $t_4$, an event can be generated that results in beginning the fourth ACI transaction at time $t_5$, and upon completion of the third ACI transaction at time $t_6$, an event can be generated that results in beginning the fifth ACI transaction at time $t_7$. The third and fourth ACI transactions can occur in parallel because the third and fourth ACI transactions occur in separate boundaries, the memory locations locked by the third and fourth transactions do not overlap (e.g., each transaction locks distinct memory locations). Likewise, the fourth and fifth ACI transactions can occur in parallel because the fourth and fifth ACI transactions occur in separate boundaries, the memory locations locked by the fourth and fifth transactions do not overlap (e.g., each transaction locks distinct memory locations). The fourth and fifth ACI transactions can be completed at times $t_8$ and $t_9$.

FIGS. 11A-D illustrate an exemplary presentation of a form 1100 (e.g., as a graphical user interface) in response to execution of consuming application, where the form 1100 (e.g., an instance of the form) is being concurrently rendered on at least two user devices 1150 and 1152 via a communications network in accordance with embodiments of the present disclosure. In the present non-limiting example, the form 1100 can include fields 1101-1104 including data, where the form 1100 can represent a data item from a set of data items, and the data in the fields 1101-1104 can represent data elements. Users 1151 and 1153 can be interact with the form 1100 to view and modify the data elements in the form 1100.

The data elements in one or more of the fields 1101-1104 can reference other fields in the form 1100 and/or can reference other fields in other forms in the set of forms. For example, the data element in field 1102 can reference or be dependent on the data element in field 1101, the data element in field 1103 can reference or be dependent on the data element in field 1102, and the data element in field 1104 can reference or be dependent on the data element in field 1103. In the present example, the terms in the parenthesis in the fields 1102-1104 can define the relationship between the fields 1101-1104 as well as the expression that can be used by the engine when determining the data value to be included in the fields 1102-1104. The form 1100 and the fields 1101-1104 can be associated with or group in a boundary of an implied directed acyclic graph by the engine, such that changes to the data elements in any of the fields can be an event that triggers an ACI transaction within the boundary.

Figure 11A:
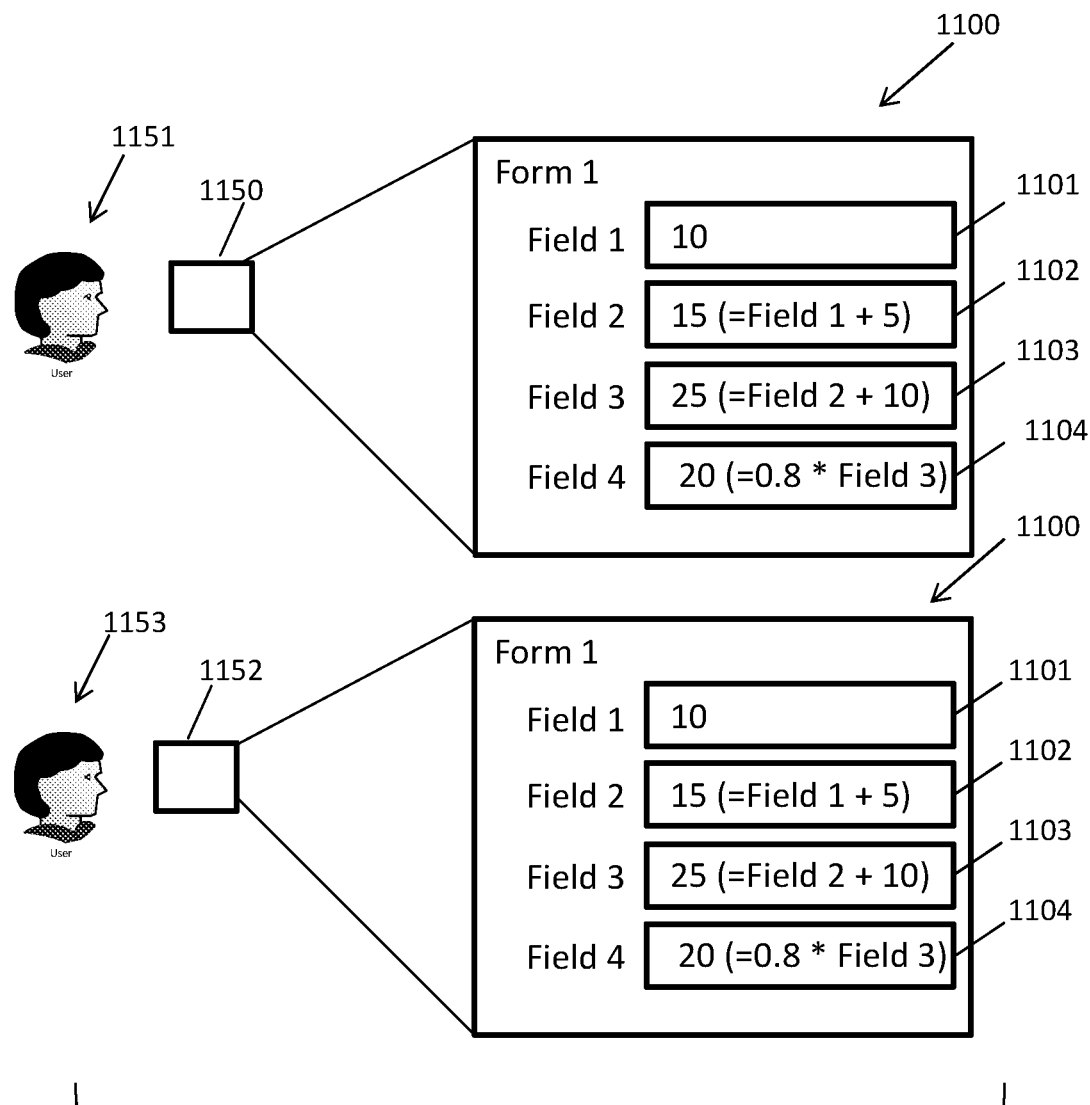
FIGS. 11A-D illustrate an exemplary presentation of an example data structure being concurrently rendered on at least two user devices in accordance with embodiments of the present disclosure.
Figure 11B:
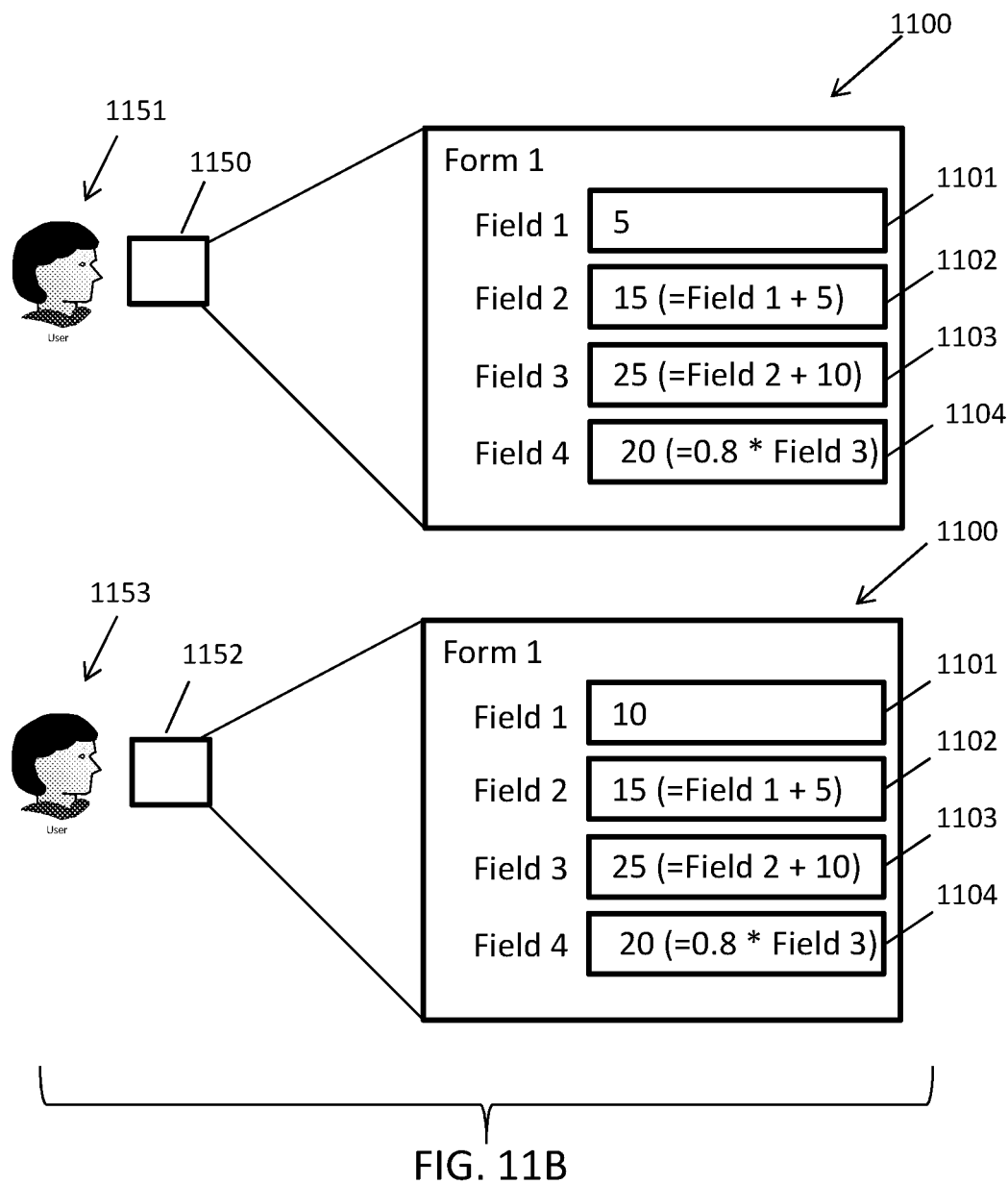

To continue the example, referring to FIG. 11B, the user 1151 can change the data element in field 1101 from "10" as shown in FIG. 11A to "5". For example, the user device 1150 can execute a client-side application, such as a web browser, that facilitates communication with a server hosting the consuming application and rendering of the form 1100 in the web browser for modification based on the interaction of the user 1151 with the user device 1150. As described herein, the consuming application can call or request the data engine to update the states of the data elements in memory. The modification of the data element in field 1101 can be an event that triggers the engine to initiate an ACI transaction to update fields within the boundary that includes field 1101. To initiate the ACI transaction, the engine allocates one or more processing devices and memory devices, and locks the memory locations associated with at least the data elements that depend from the data element being modified in field 1101. As a result of initiation of the ACI transaction, the instance of the form 1101 being rendered in the web browser of the user device 1152 is not modified to show the change to field 1101 such the user 1153 remains unaware of the modification.

Figure 11C:
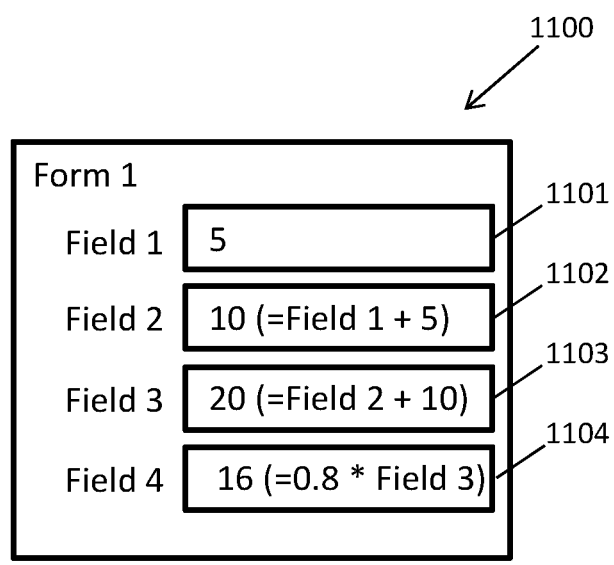
Figure 11D:
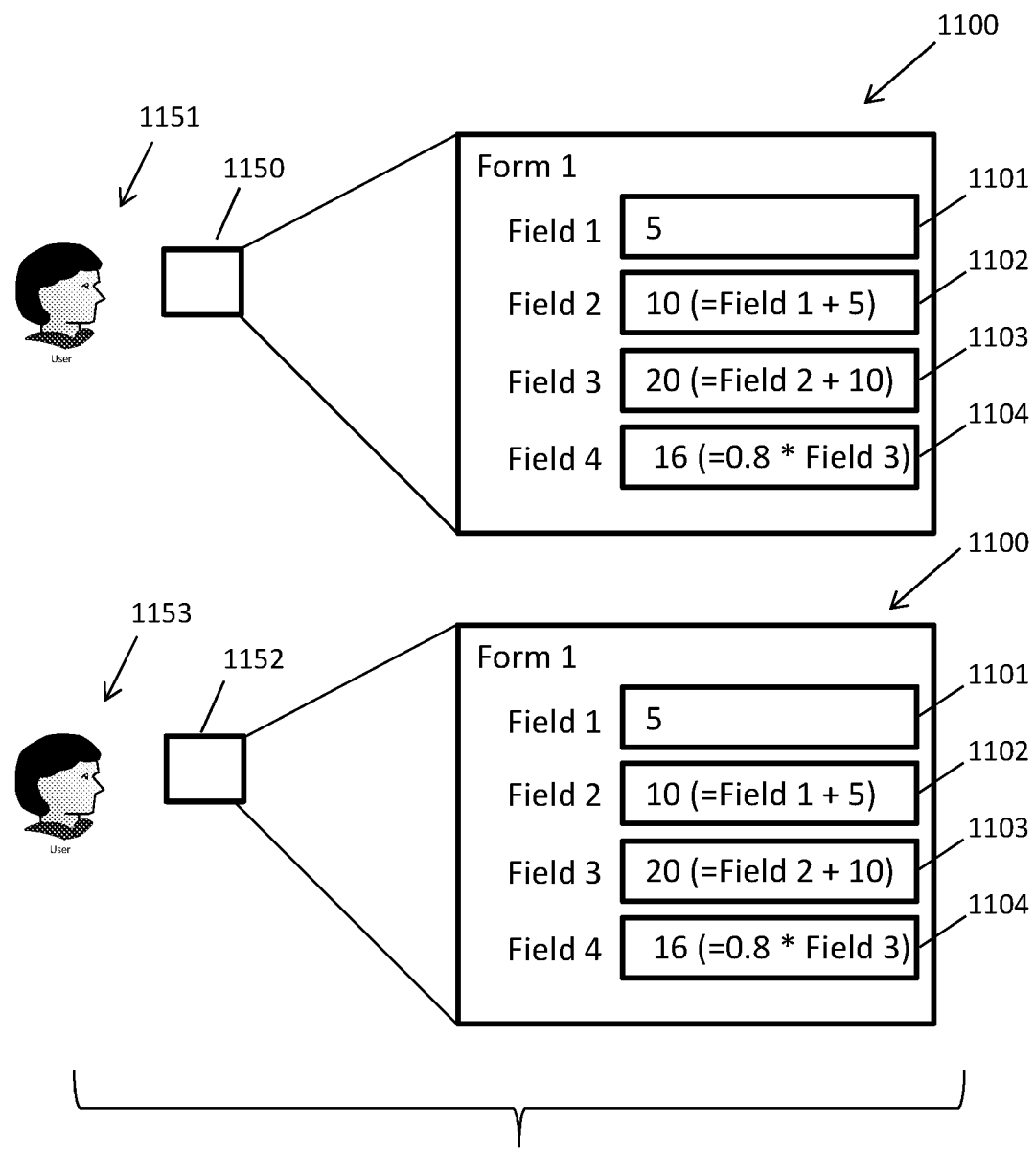

As the one or more allocated processing devices execute the engine (or instances thereof) to perform the ACI transaction, one or more intermediate operations to modify to the data elements in the fields 1102-1004 can occur. For example, with reference to FIG. 11C, the one or more processing devices executing the engine can perform a series of calculations to recalculate the values associated with the data elements in the fields 1101-1104 based on their dependence, directly or indirectly, data element in field 1101. While these intermediate operations are being performed by the processing device, neither instance of the form 1100 being viewed by the user 1151 or 1153 are updated to show modifications to the data elements in the fields 1101-1104 such that the instances of the form 1100 being displayed to the users 1151 and 1153 remain the same as shown in FIG. 11C. Rather, the data elements are being modified in memory (e.g., via data reads and writes). When the ACI transaction is completed and the memory locations are unlocked, at which time both instances of the form 1100 are updated to show all of the changes to the form 1100, as shown in FIG. 11D.

FIGS. 12A-D illustrate an exemplary scenario in which a form 1200 (e.g., as a graphical user interface) is presented to a user 1251 of a user device 1250 in response to execution of consuming application. In the present non-limiting example, the form 1200 can include fields 1201-1205 including data, where the form 1200 can represent a (first) data item from a set of data items, and the data in the fields 1201-1205 can represent data elements. The user 1251 can be interact with the form 1200 to view and modify the data elements in the form 1200.

The data elements in one or more of the fields 1201-1205 can reference other fields in the form 1200 and can reference data elements associated with fields 1221-1224 in a form 1220 in the set of forms. For example, the data element in field 1202 can reference or be dependent on the data element in field 1201, the data element in field 1203 can reference or be dependent on the data element in field 1202, and the data element in field 1205 can reference or be dependent on the data element in field 1204. The data element in field 1204 of the form 1200 can reference or be dependent on the data element in field 9. Likewise, the data element associated with the field 1221 of the form 1220 can reference or be dependent on the data element associated with the field 1202 of the form 1200. In the present example, the terms in the parenthesis in the fields 1202-1205, 1221-1222, and 1224 can define the relationship between the fields 1201-1205 and 1221-1224 as well as the expression that can be used by the engine when determining the data value to be included in the fields 1102-1105, 1221-1222, and 1224. The consuming application can be programmed such that forms 1200 and 1220 are never concurrently displayed to a user. Based on this, the engine can determine that the forms 1200 and 1220 (and their respective fields) can be in separate and distinct boundaries of an implied directed acyclic graph. For example, the form 1200 and the fields 1201-1205 can be associated with or grouped in a first boundary of an implied directed acyclic graph by the engine and the form 1220 and the fields 1221-1224 can be grouped in a second boundary.

Figure 12A:
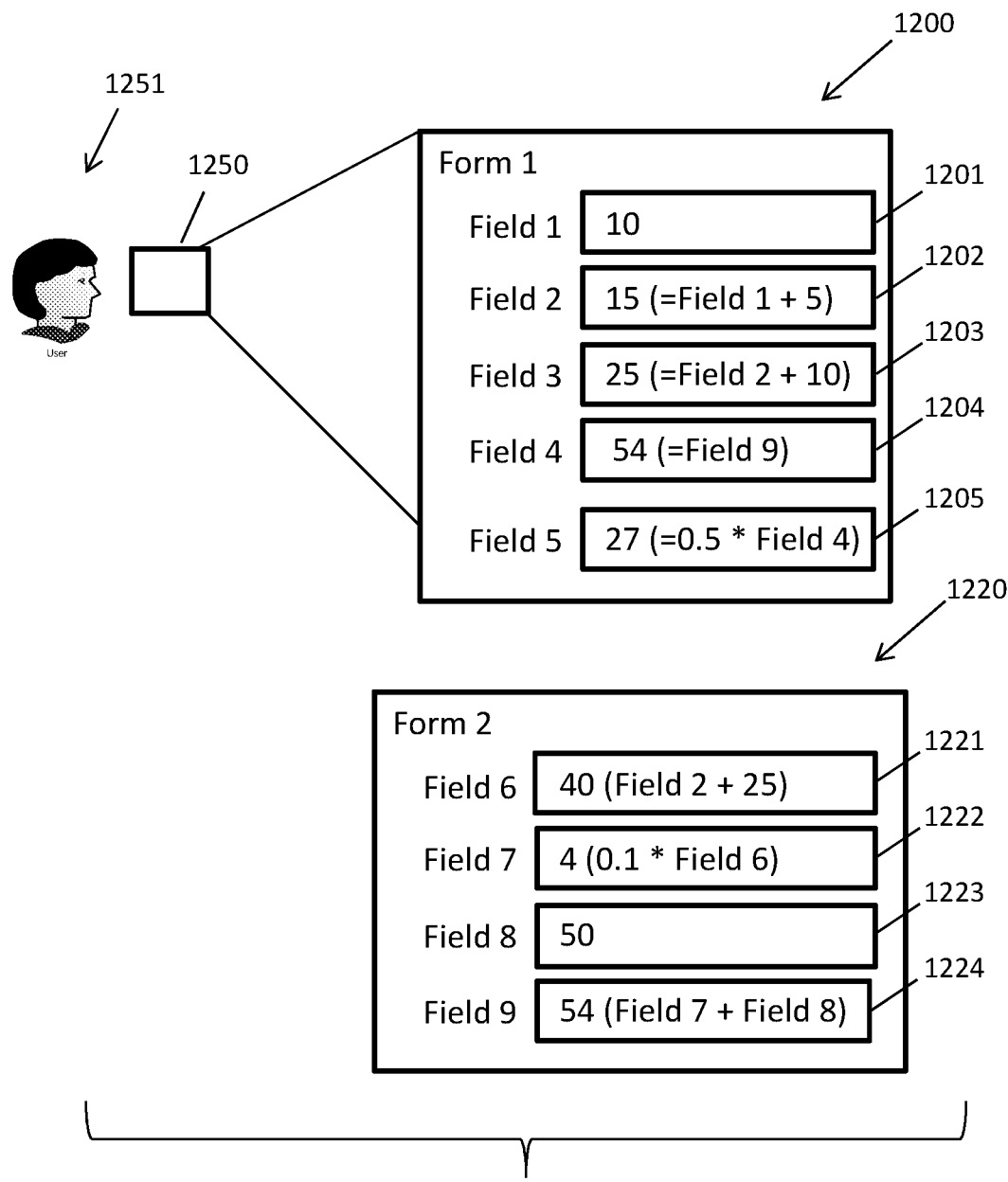
FIGS. 12A-E illustrate an exemplary scenario in which an example data structure is presented to a user in response to execution of consuming application in accordance with embodiments of the present disclosure.
Figure 12B:
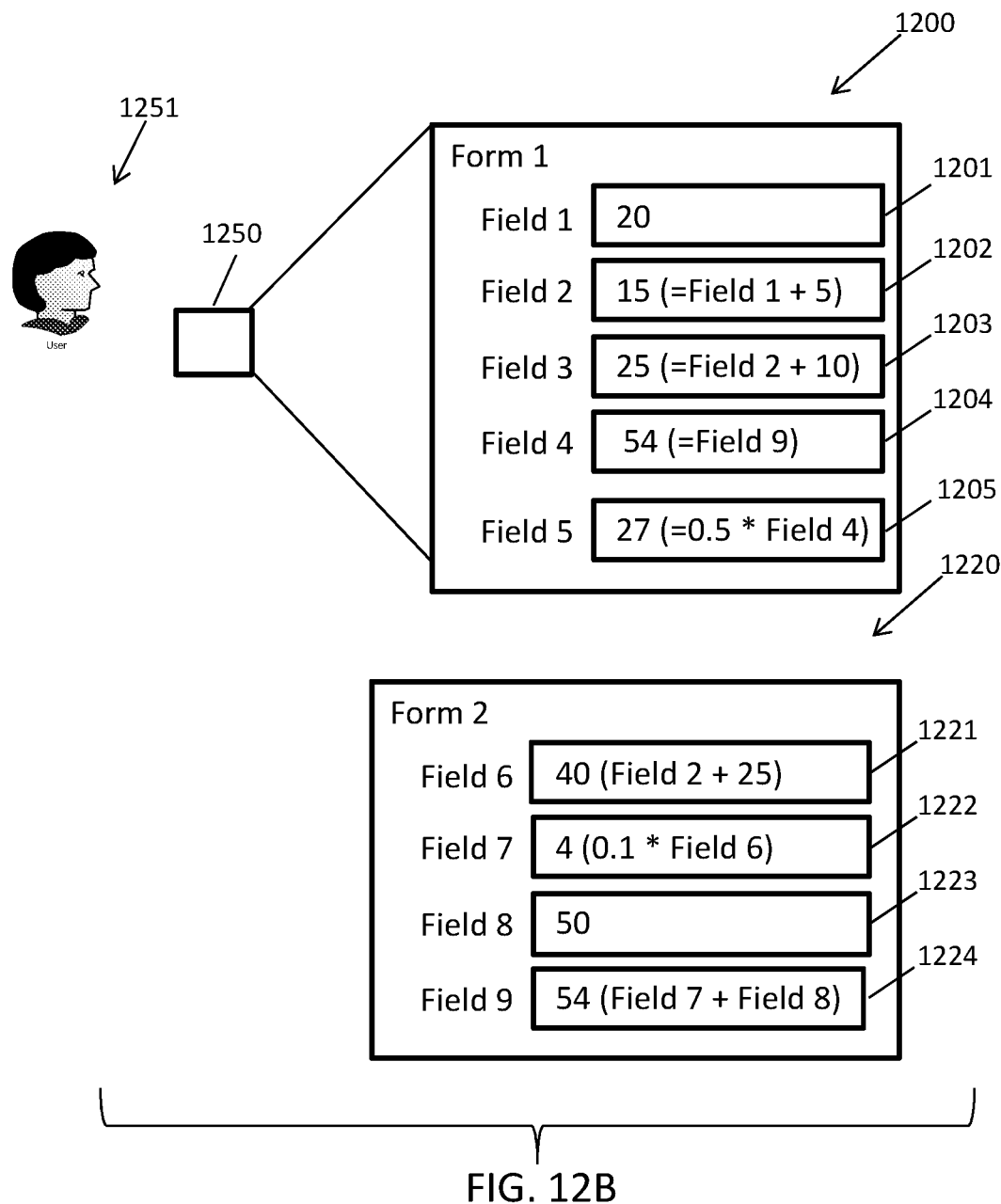
Figure 12C:
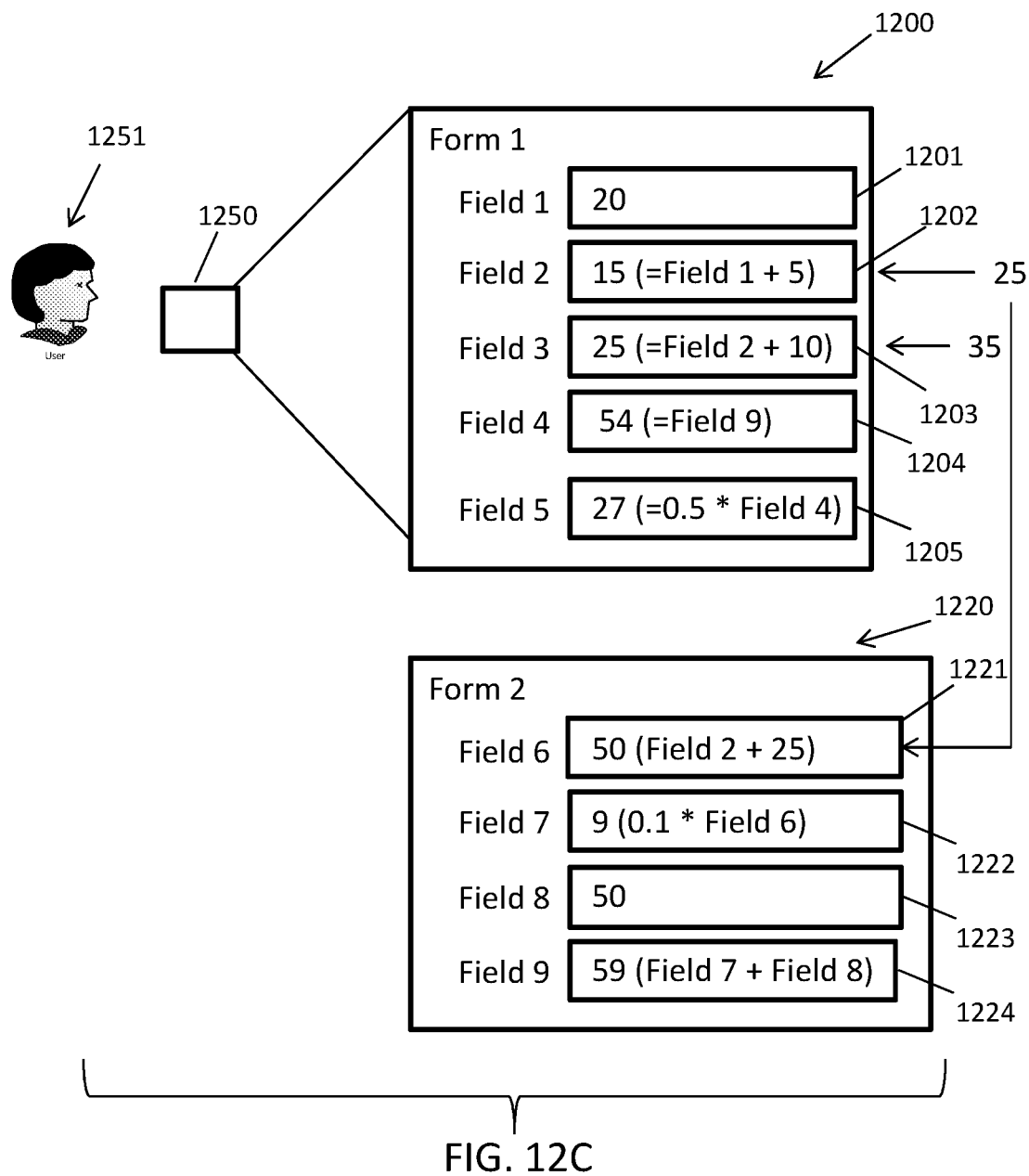

To continue the example, referring to FIG. 12B, the user 1251 can change the data element in field 1201 from "10" as shown in FIG. 12A to "5" as shown in FIG. 12B. For example, the user device 1150 can execute a client-side application, such as a web browser, that facilitates communication with a server hosting the consuming application and rendering of the form 1200 in the web browser for modification based on the interaction of the user 1251 with the user device 1250. As described herein, the consuming application can call or request the data engine to update the states of the data elements in memory. The modification of the data element in field 1201 can be an event that triggers the engine to initiate a first ACI transaction to update fields within the first boundary based on the modification to the data element in the field 1201. To initiate the first ACI transaction, the engine allocates one or more processing devices and memory devices, and locks the memory locations associated with at least the data elements that depend from the data element being modified in field 1201.

Figure 12D:
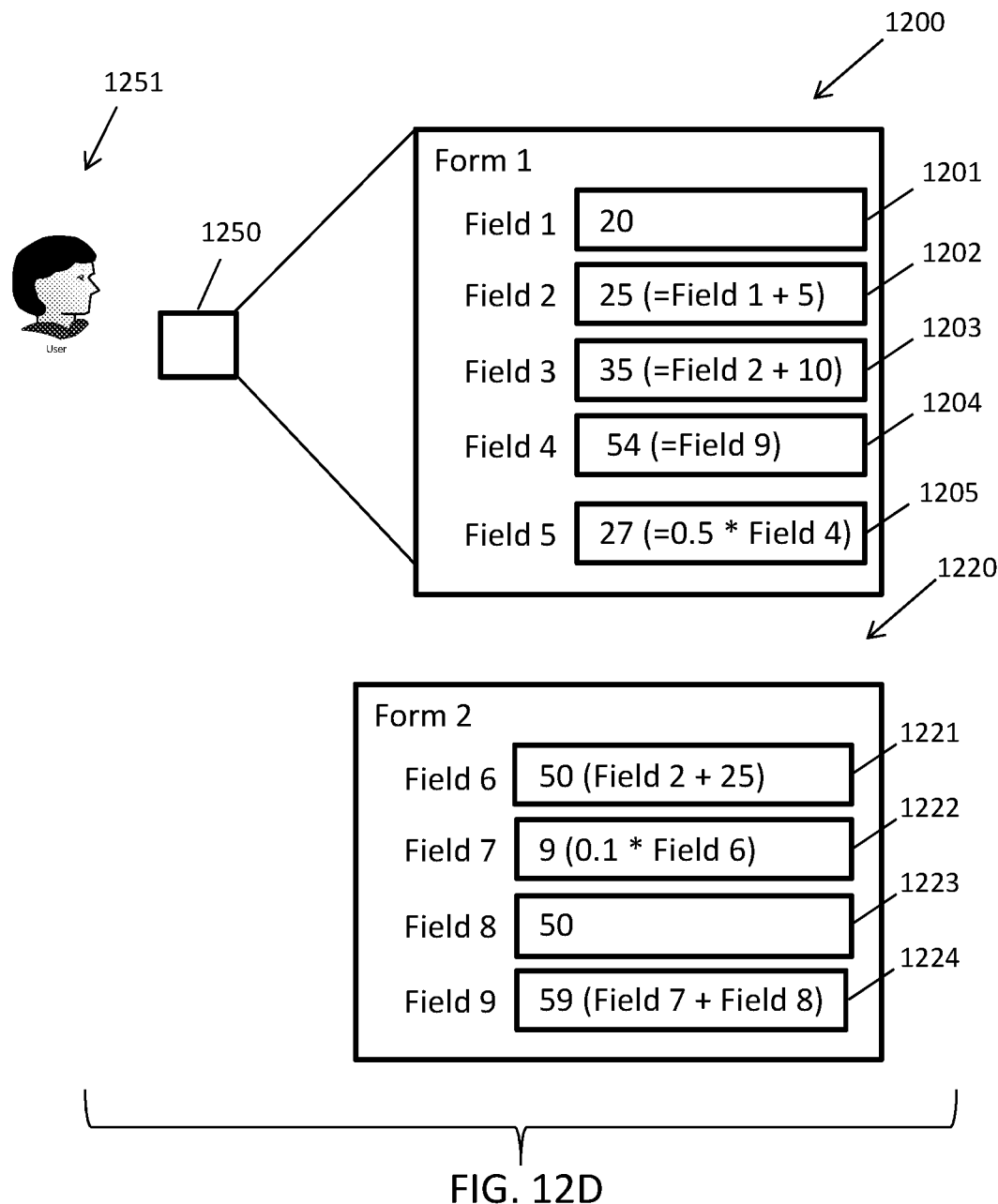

As the one or more allocated processing devices execute the engine (or instances thereof) to perform the first ACI transaction, one or more intermediate operations to modify the data elements in the fields 1202-1203 can occur. For example, with reference to FIG. 12C, the one or more processing devices executing the engine can perform a series of calculations to recalculate the values associated with the data elements in the fields 1202-1203 based on their dependence, directly or indirectly, data element in field 1201. While these intermediate operations are being performed by the processing device, the form 1200 being viewed by the user 1251 is not updated to show the intermediate modifications to the data elements in the fields 1202-1203 such that the form 1200 being displayed to the user 1251 remains the same as shown in FIG. 12B. Rather, the data elements are being modified in memory (e.g., via data reads and writes). Because the data element associated with field 1221 of the form 1220 refers to or depends on the data element in the field 1202 of the form 1200, the modification of the data element associated with field 1202 can be an event that triggers a second ACI transaction (e.g., a cross boundary event). In response to the event, the engine can allocate one or more processing devices and memory devices to perform a second ACI transaction, and locks the memory locations associated with at least the data elements that depend from the data element being modified in field 1221. The second ACI transaction can be performed asynchronously from and in parallel to the first ACI transaction. After the one or more processing devices complete the first ACI transaction, and while the second ACI transaction is pending, the one or more processing devices that performed the first transaction can unlock the memory locations associated with the first ACI transaction, at which time the form 1200 being viewed by the user 1251 can be updated to show all of the changes to the form 1200 resulting from the first ACI transaction, as shown in FIG. 12D.

Figure 12E:
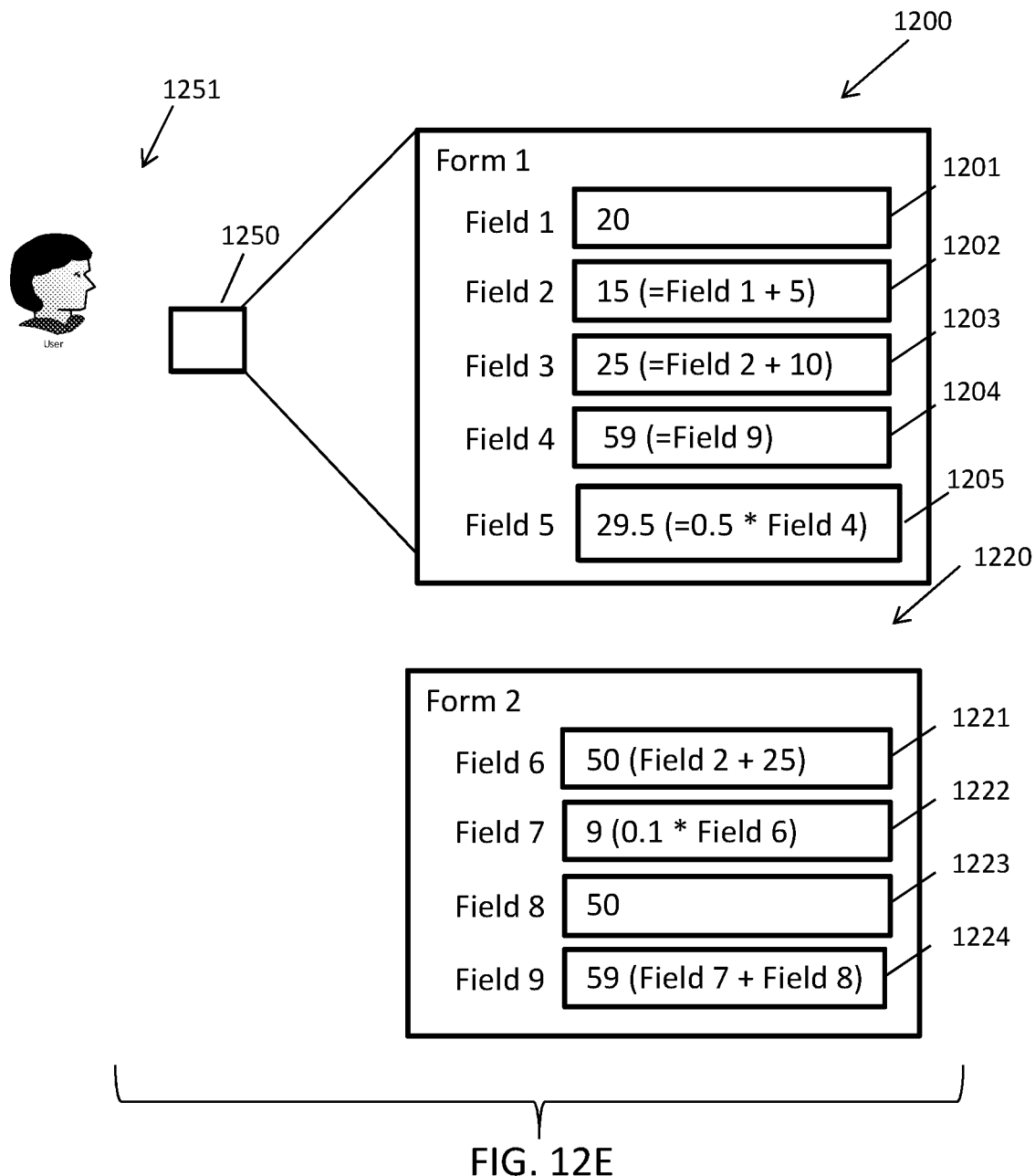

The one or more processing devices allocated to the second ACI transaction can continue to perform the second ACI transaction to completion. In the course of performing the second ACI transaction, the one or more processing devices can modify the data element in field 1224, which can generate a cross boundary event because the data element associated the field 1204 in the form 1200 refers to or depends on the data element associated with the field 1224 in the form 1220. In response to this event, the engine can allocate one or more processing devices and memory devices to perform a third ACI transaction to update data associated with the field 1204 in the form 1200 as well as any other data elements that reference or depend on the data element in field 1204 (e.g., the data element associated with the field 1205). While the one or more processing devices performing the third ACI transaction are performing intermediate operations (e.g., recalculating the data elements associated with the fields 1204 and 1205), the form 1200 being viewed by the user 1251 is not updated. Rather, the data elements are being modified in memory (e.g., via data reads and writes). Upon completion of the third ACI transaction, the one or more processing devices allocated to the third ACI transaction can release the locked memory locations for the third ACI transaction, at which time the form 1200 being viewed by the user 1251 can be updated to show all of the changes to the form 1200 resulting from the third ACI transaction, as shown in FIG. 12E.

Figure 13:
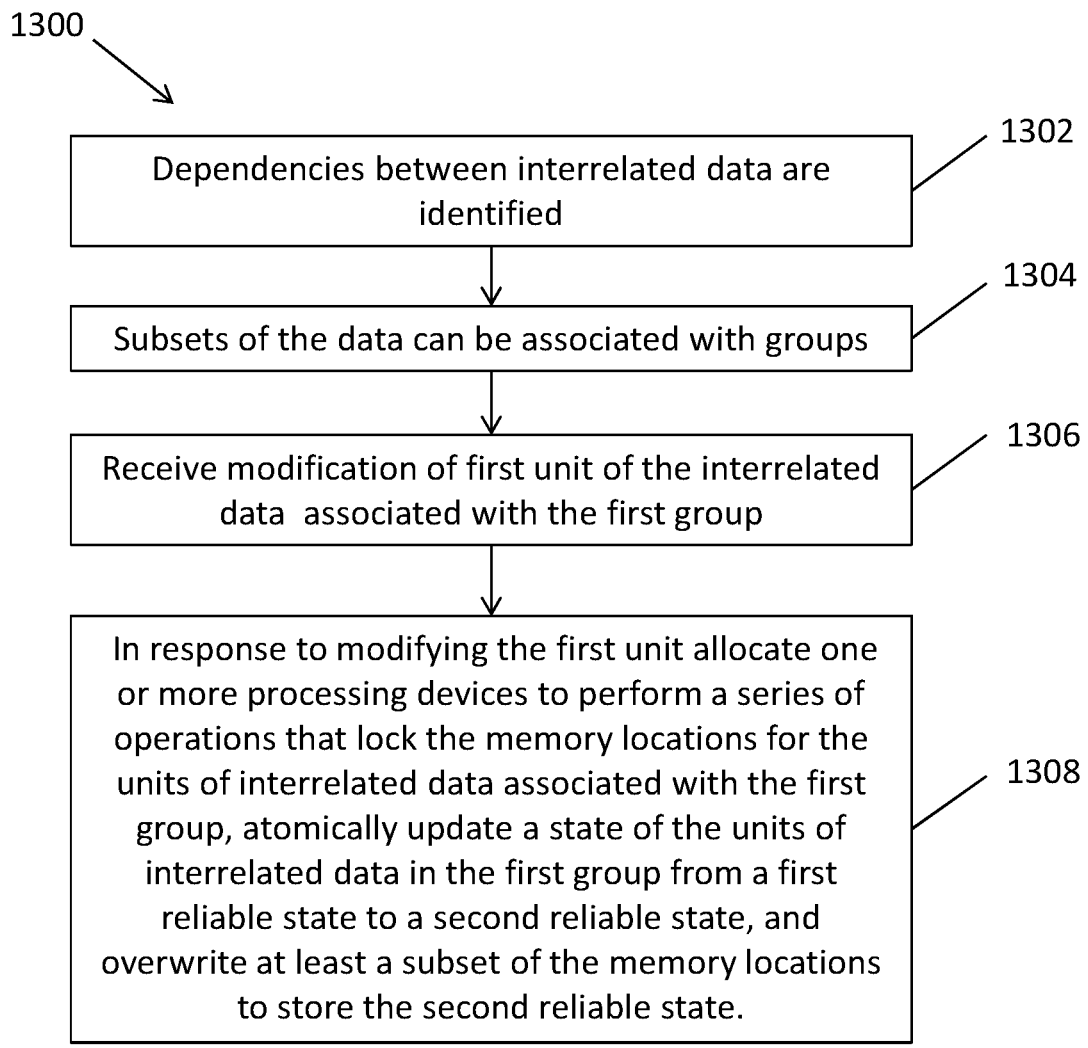
FIG. 13 is a flowchart illustrating an exemplary process for maintaining eventual consistency of interrelated data in accordance with embodiments of the present disclosure.

FIG. 13 is a flowchart illustrating an exemplary process 1300 for maintaining consistency of interrelated data in accordance with embodiments of the present disclosure. In exemplary embodiments, the process 1300 can be implemented in accordance FIGS. 1-12 of the present disclosure. At step 1302, dependencies between interrelated data stored in memory locations in one or more data storage devices can be identified by one or more processing executing the engine. For example, one or more sets of interrelated data can be stored in the data storage devices as units of data (e.g., data items and/or elements) and the one or more processing device can access the memory locations to determine which of the units of data are referenced by or make reference to other units of the data. To determine whether unit of data references another unit of data, the one or more processing device can evaluate a definition for the data, which may include literal values and/or one or more expressions which may include variables and/or literal values and functions. In some instances, the variables in the expression may refer or point to another unit of data. Based on this reference, the one or more processing devices can determine the unit of data including the reference to another unit of data depends on the other unit of data. The one or more processing devices can execute the engine to track these dependencies, which can be used to associate the interrelated units of data with each other via an implied or explicit directed acyclic graph.

At step 1304, subsets of the data can be associated with groups (e.g., a first group, a second group, a third group, a fourth group, and so on) by the one or more processing based on a configuration of the consuming application and the dependencies between the interrelated data to be consumed by the consuming application. In exemplary embodiments, the groups can correspond to boundaries within the implied directed acyclic graph and the one or more processing devices can maintain a consistency of the state of the interrelated data based on the boundaries (e.g., on a boundary-by-boundary basis).

The one or more processors executing the engine can associate the interrelated units of data with the groups and/or boundaries based on information provided by or extracted from the consuming application. As one example, the one or more processors can determine whether the consuming application is configured to concurrently present interrelated units of data to one or more of the user devices via the user interface of the consuming application.

At step 1306, a first unit of the interrelated data stored in a first memory location, and associated with the first group and/or boundary can be modified by the one or more processing devices. As an example, the consuming application being executed by a server can receive a modification of the first unit of interrelated data from a user via a user device via a communications network, and the consuming device can call or request that the engine update first unit of data based on the modification. In response to modifying the first unit of data stored in the first memory location, at step 1308, one or more of processing devices can be allocated to perform a series of operations (e.g., an ACI transaction) that lock the memory locations for the units of interrelated data associated with the first group or boundary (e.g., a first set of memory locations) to prevent reading or writing the memory locations, atomically update a state of the units of interrelated data in the first group from a first reliable state to a second reliable state, and overwrite at least a subset of the memory locations to store the second reliable state. Upon complete of the series of operations (e.g., once the memory locations are overwritten), the one or more processing devices can unlock the memory locations. When modification of the first unit of data only affects the units of data associated with the first group the memory locations of the units of interrelated data that have been associated with other groups remain can remain unlocked throughout the series of operations. By only locking the memory location within an affected group, the one or processing devices executing the engine can mitigate data contentions that would otherwise occur if these memory locations were also locked.

In the event that the modification of the first unit of data affects units of data associated with the first as well as other groups (e.g., the second group), the memory locations of the units of data associated with the other groups can remain unlocked and have an unreliable state for at least a portion of a duration of the series of operations. As an example, during the perform of the series of operations for the units of data in the first group, the one or more processing devices can generate an event that initiates new series of operations to update the state of the units of data in the other groups (e.g., the event can correspond to an eventual modification of a unit of data in the first group upon which a unit of data in the second group directly depends).

One or more processing devices, which can be the same as the one or more processing device were allocated to perform the series of operations associated with the first group or can be one or more different processing devices, can be allocated to perform separate and new series of operations for each of the other groups for which an event was generated. For example, when event is generated for the second group based on the performance of the series of operations for the first group, one or more processing devices can be allocated to perform a separate and new series of operations associated with the second group that lock the memory locations for the interrelated units of data associated with the second group to prevent reading or writing the memory locations and atomically update the state of the interrelated units of data associated with the second group from the unreliable state to a reliable state. In exemplary embodiments, at least a portion of the series of operations associated with the first group and the separate and new series of operations associated with the second group can be performed as parallel operations. In exemplary embodiments, different processing device can be allocated to perform different series of operations (e.g., a first processing device can be allocated to process the series of operations associated with the first group and a second processing device can be allocated to perform a series of operations associated with the second group.

Figure 14:
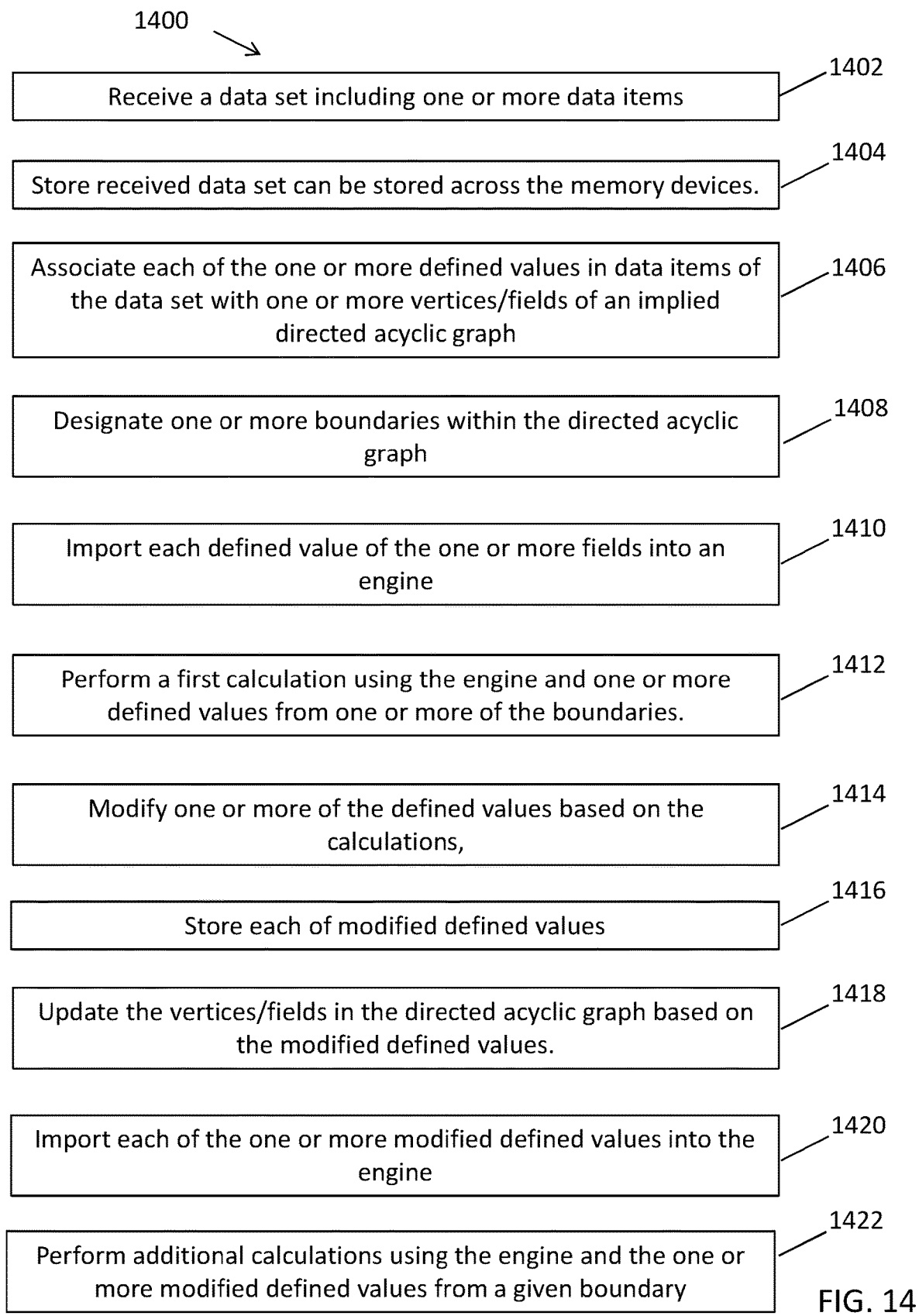
FIG. 14 is a flowchart illustrating another exemplary process for maintaining eventual consistency of interrelated data in accordance with embodiments of the present disclosure.

FIG. 14 is a flowchart illustrating another exemplary process 1400 for maintaining consistency of interrelated data in accordance with embodiments of the present disclosure. In exemplary embodiments, the process 1400 can be implemented in accordance FIGS. 1-12 of the present disclosure. At step 1402, a data set including one or more data items can be received by a distributed computing system including shared computer resources. The shared computer resources can includes servers having one or more processing devices and data storage devices formed of one or more memory devices. At step 1404, the received data set can be stored across the memory devices. At step 1406, each of the one or more data items of the data set can be associated with one or more vertices/fields of an implied directed acyclic graph such that each vertex/field can include a defined value, which can be null, a literal value, or an expression. At step 1408, one or more boundaries can be designated within the directed acyclic graph, where each boundary is associated with a subset of the data items in the data set.

At step 1410, each defined value of the one or more fields can be imported into the engine, which can be configured to perform calculations. At step 1412, a first calculation can be performed using the engine and one or more defined values from one or more of the boundaries. At step 1414, one or more of the defined values can be modified based on the calculations, and at step 1416, each of modified defined values can be stored in the memory devices to overwriting a given defined value with a corresponding modified defined value. At step 1418, the vertices/fields in the directed acyclic graph can be updated with a defined value for each of the one or more modified defined values. At step 1420, each of the one or more modified defined values can be imported into the engine, and at step 1422, additional calculations can be performed using the engine and the one or more modified defined values from a given boundary.

Figure 15:
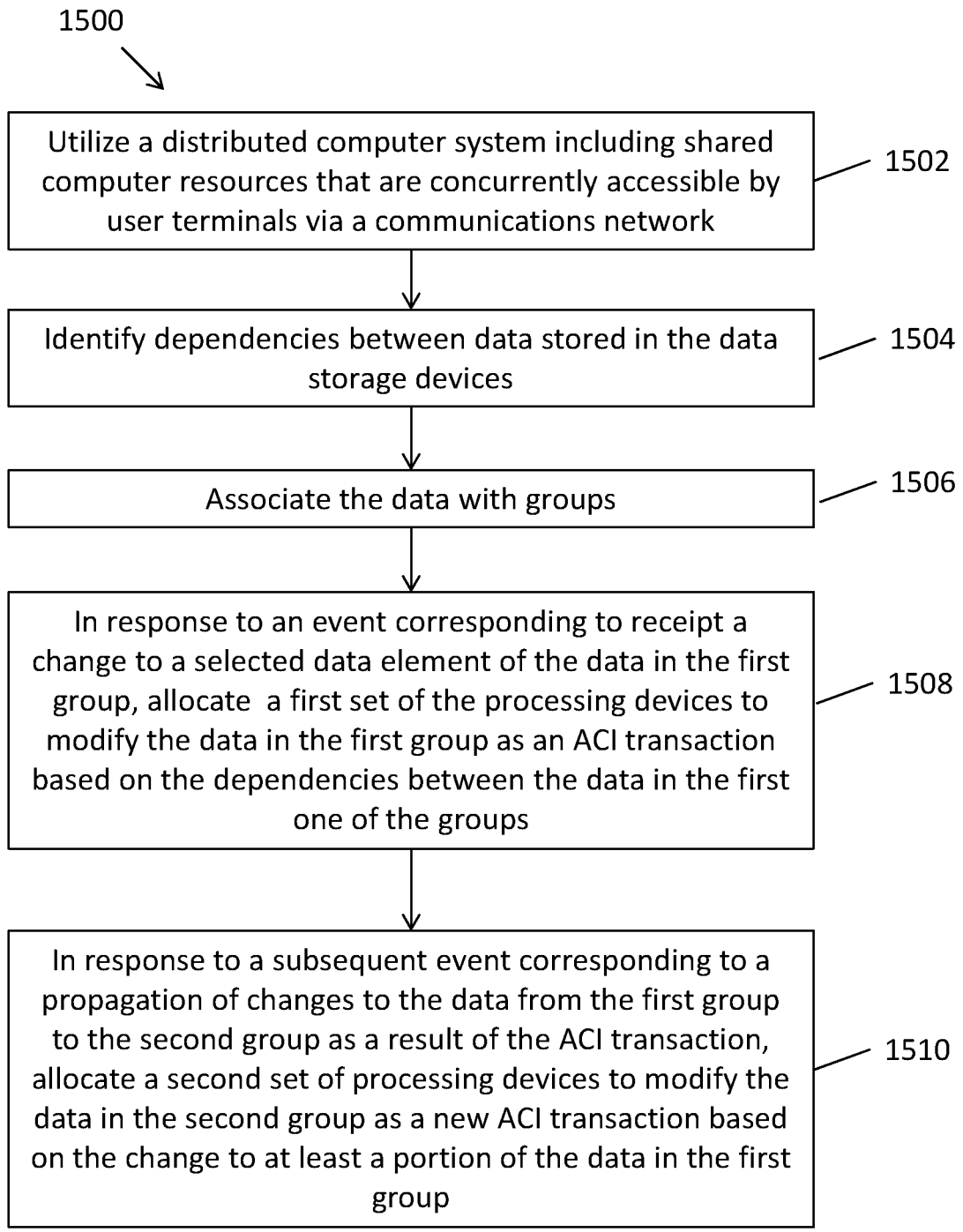
FIG. 15 is a flowchart illustrating an exemplary process implemented by shared resources in a distributed computing system to implement embodiments of the present disclosure.

FIG. 15 is a flowchart illustrating an exemplary process 1500 implemented by shared resources in a distributed computing system to implement embodiments of the present disclosure. In exemplary embodiments, the process 1500 can be implemented in accordance FIGS. 1-12 of the present disclosure. At step 1502, a distributed computer system including shared computer resources that are concurrently accessible by user terminals via a communications network can be utilized. The shared computer resources can include processing devices (e.g., of servers) and data storage devices. At step 1504, dependencies between data stored in the data storage devices can be identified as described herein, and at step 1506, the data can be associated with groups (e.g., first and second groups) based on a configuration of an application consuming the data and/or the dependencies between the data.

In response to an event corresponding to receipt a change to a selected data element of the data in the first group via the application, at step 1508, a first set of the processing devices can be allocated to modify the data in the first group as an atomic, consistent, and isolated (ACI) transaction based on the dependencies between the data in the first one of the groups. In response to a subsequent event corresponding to a propagation of changes to the data from the first group to the second group as a result of the ACI transaction, at step 1510, allocating a second set of processing devices to modify the data in the second group as a new ACI transaction based on the change to at least a portion of the data in the first group. In exemplary embodiments, the new ACI transaction is performed asynchronously from the ACI transaction.

The foregoing description of the specific embodiments of the subject matter disclosed herein has been presented for purposes of illustration and description and is not intended to limit the scope of the subject matter set forth herein. Any combination and/or permutation of embodiments described herein is envisioned. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A distributed computer system comprising:
shared computer resources that are concurrently accessible by user devices via a communications network, the shared computer resources including processing devices and one or more data storage devices,
the one or more data storage devices storing interrelated units of data to be consumed by a consuming application that includes a user interface accessible by the user devices via the communications network to facilitate concurrent interaction with the consuming application by at least two of the user devices, the interrelated units of data comprise data structures including data elements to be presented via the user interface when the data structures are rendered via the user interface,
one or more of the processing devices execute an engine to identify a first group of the data structures that are configured to be concurrently rendered via the user interface of the consuming application and a second group of the data structures that are configured to be concurrently rendered via the user interface of the consuming application, the first group and the second group are mutually exclusive to each other, wherein the data elements in the data structures in the first group depend on or refer to other ones of the data elements in the data structures of the first group and depend on or refer to at least one of the data elements in the data structures of the second group such that dependencies exist between the data elements in the first group and between the data elements in the first and second groups,
wherein, in response to modification of a first data value of one of the data elements in a first one of the data structures associated with the first group, the one or more of the processing devices perform a series of operations on the first and second groups based on the dependencies, the series of operations performed on the first group are completed before the series of operations are begin on the second group, the series of operations performed on first group (i) restrict access to a first set of memory locations at which the data elements of the data structures associated with the first group are stored to prevent reading or writing the memory locations and (ii) atomically modify, based on the modified first data value, data values of the data elements in the data structures in the first group that, directly or indirectly, depend on or refer to the first data value from a first reliable state to a second reliable state as a first isolated transaction.

2. The system of claim 1, wherein the one or more of the processing devices associate the interrelated units of data with each other via an implied directed acyclic graph based on the dependencies.

3. The system of claim 2, wherein the one or more of the processing devices modify the implied directed acyclic graph in response to changes to the dependencies between the interrelated units of data.

4. The system of claim 2, wherein the groups correspond to boundaries within the implied directed acyclic graph, the one or more of the processing devices maintaining a consistency of the state of the interrelated data based on the boundaries.

5. The system of claim 4, wherein the one or more of the processing devices modify at least one of the boundaries based on at least one of changes to the dependencies between the interrelated units of data or changes to the consuming application.

6. The system of claim 1, wherein the one or more of the processing devices lock the first set of memory locations to prevent reading or writing the memory locations in response to modification of the first unit of data associated with the first group, and
wherein modification of the first unit of data only affects the units of data associated with the first group, and the one or more of the processing devices overwrite and unlock the first set of memory locations upon completion of the series of operations, a second set of memory locations of the interrelated units of data associated with the second group remain unlocked throughout the series of operations.

7. The system of claim 1, wherein modification of the first unit of data affects the units of data associated with the first and second groups, and a second set of memory locations of the interrelated units of data associated with the second group remain unrestricted and have an unreliable state for at least a portion of a duration of the series of operations.

8. The system of claim 7, wherein, in response to an event generated by the one or more processing devices during the series of operation, the one or more processing devices perform a separate series of operations that lock the second set of memory locations at which the interrelated units of data associated with the second group are stored to prevent reading or writing the second set of memory locations and atomically update the state of the interrelated units of data associated with the second group from the unreliable state to the second reliable state.

9. The system of claim 8, wherein at least a portion of the series of operations and the separate series of operations are performed as parallel operations by the one or more of the processing devices.

10. The system of claim 8, wherein a first one of the processing devices is allocated to perform the series of operations and a second one of the processing devices is allocated to perform the separate series of operations.

11. The system of claim 8, wherein the event corresponds to modification of another unit of data associated with the first group upon which at least one of the units of data associated with the second group of data directly depends.

12. A computer-implemented method comprising:
associating subsets of interrelated data structures that include data elements with groups based on whether an application programmed to consume the interrelated data structures is configured to concurrently render the data elements of the interrelated data structures via a user interface of the application, the groups including at least a first group including a first set of the interrelated data structures that are configured to be concurrently rendered and a second group including a second set of the interrelated data structures that are configured to be concurrently rendered;
identifying dependencies between the data elements of the interrelated data structures, wherein the data elements in first set of the data structures in the first group depend on or refer to other ones of the data elements in the data structures of the first group and depend on or refer to at least one of the data elements in the data structures of the second group such that dependencies exist between the data elements in the first group and between the data elements in the first and second groups;

modifying a first data value of one of the data elements in the first set of the interrelated data structures in the first group stored in a first memory location;

in response to modifying the first data value of one of the data elements in the first set of data structures, allocating one or more processing devices to perform a series of operations on the first and second groups based on the dependencies, the series of operations performed on the first group are completed before the series of operations are begin on the second group, the series of operations performed on first group (i) restrict access to a first set of the memory locations at which a first subset of the data elements of the first set of the interrelated data structures corresponding to the first group are stored to prevent reading or writing the first set of memory locations, (ii) atomically modify, based on the modified first data value of the one of the data elements, other data values of the data elements in the first set of the interrelated data structures in the first group that, directly or indirectly, depend on or refer to the first data value from a first reliable state to a second reliable state, and (iii) overwrite the at least a subset of the first set of memory locations to store the second reliable state.

13. The method of claim 12, further comprising associating the interrelated data with each other via an implied directed acyclic graph based on the dependencies.

14. The method of claim 13, further comprising modifying the implied directed acyclic graph in response to changes to the dependencies between the interrelated units of data.

15. The method of claim 13, wherein the groups correspond to boundaries within the implied directed acyclic graph, and the method further comprises:
maintaining a consistency of the state of the interrelated data based on the boundaries.

16. The method of claim 15, further comprising modifying at least one of the boundaries based on at least one of changes to the dependencies between the interrelated units of data or changes to the consuming application.

17. The method of claim 12, wherein modification of the first unit only affects the first subset of the interrelated data associated with the first group, and the method further comprises:
locking, by the one or more processing devices, the first set of the memory locations in response to modifying the first unit stored in the first memory location;
unlocking the first set of memory location upon completion of the series of operations,
wherein a second set of memory locations at which a second subset of the interrelated data associated with the second group are stored remain unlocked throughout the series of operations.

18. The method of claim 12, wherein modification of the first unit affects the first subset of interrelated data associated with the first group and a second subset of the interrelated data associated with the second group, and a second set of memory locations at which the second subset of the interrelated data associated with the second group are stored remain unrestricted and have an unreliable state for at least a portion of a duration of the series of operations.

19. The method of claim 18, wherein, in response to an event generated by the one or more processing devices during the series of operation, the method further comprises:
allocating the one or more processing devices to perform a separate series of operations that lock the second set of memory locations at which the second subset of the interrelated data associated with the second group are stored to prevent reading or writing the second set of memory locations and atomically update the state of the second subset of the interrelated data associated with the second group from the unreliable state to the second reliable state.

20. The method of claim 19, further comprises:
performing at least a portion of the series of operations and the separate series of operations as parallel operations.

21. The method of claim 19, wherein allocating the one or more processing devices to perform a series of operations comprises allocating a first one of the processing devices to perform the series of operations, and allocating the one or more processing devices to perform a separate series of operations comprises allocating a second one of the processing devices to perform the separate series of operations.

22. The method of claim 19, wherein the event corresponds to modification of another unit of the interrelated data associated with the first group upon which at least one unit of the interrelated data associated with the second group directly depends.

23. A computer-implemented method comprising:
utilizing a distributed computer system including shared computer resources that are concurrently accessible by user terminals via a communications network, the shared computer resources including processing devices and data storage devices;
associating interrelated data structures that include data elements with groups based on whether an application configured to consume the interrelated data structures is configured to concurrently render the data elements of the interrelated data structures via a user interface of the application, the groups including at least a first group including a first set of the interrelated data structures that are configured to be concurrently rendered and a second group including a second set of the interrelated data structures that are configured to be concurrently rendered;
identifying dependencies between the data elements of the interrelated data structures, wherein the data elements in first set of the data structures in the first group depend on or refer to other ones of the data elements in the data structures of the first group and depend on or refer to at least one of the data elements in the data structures of the second group such that dependencies exist between the data elements in the first group and between the data elements in the first and second groups;
in response to an event corresponding to receipt of a change to a data value of one of the data elements of a first one of the interrelated data structures associated with the first group being rendered via the application, allocating a first set of the processing devices to modify the other data values of the data elements in the first set of the interrelated data structures in the first group that, directly or indirectly, depend on or refer to the first data value as an atomic, consistent, and isolated (ACI) transaction based on the dependencies between the interrelated data in the first group; and
in response to a subsequent event corresponding to a propagation of changes to the the data elements in the first set of the interrelated data structures from the first group to the second group as a result of the ACI transaction, allocating a second set of processing devices to modify the at least one of the data elements in the second set of the interrelated data structures in the second group that, directly or indirectly, depend on or refer to the first data value as a new ACI transaction based on the change to the first data value of the one of the data elements in the first set of the interrelated data structures in the first group, wherein the new ACI transaction is performed asynchronously from the ACI transaction.

* * * * *